US012736843B2

(12) United States Patent
Matsui

(10) Patent No.: US 12,736,843 B2
(45) Date of Patent: Sep. 15, 2026

(54) LIGHT SOURCE DEVICE AND DISPLAY

(71) Applicant: SATURN LICENSING LLC, New York, NY (US)

(72) Inventor: Hiroaki Matsui, Tokyo (JP)

(73) Assignee: SATURN LICENSING LLC, New York, NY (US)

( * ) Notice: Subject to any disclaimer, the term of this patent is extended or adjusted under 35 U.S.C. 154(b) by 159 days.

(21) Appl. No.: 18/715,940

(22) PCT Filed: Oct. 20, 2022

(86) PCT No.: PCT/JP2022/039150
§ 371 (c)(1),
(2) Date: Jun. 3, 2024

(87) PCT Pub. No.: WO2023/105946
PCT Pub. Date: Jun. 15, 2023

(65) Prior Publication Data

US 2025/0028200 A1 Jan. 23, 2025

(30) Foreign Application Priority Data

Dec. 9, 2021 (JP) ................................ 2021-199857
Jun. 3, 2022 (JP) ................................ 2022-090950

(51) Int. Cl.
*G02F 1/13357* (2006.01)
*G02F 1/1335* (2006.01)

(52) U.S. Cl.
CPC .. *G02F 1/133603* (2013.01); *G02F 1/133605* (2013.01); *G02F 1/133612* (2021.01)

(58) Field of Classification Search
CPC .. G02F 1/1336; G02F 1/13361; H10H 29/857
See application file for complete search history.

(56) References Cited

FOREIGN PATENT DOCUMENTS

| | | | | |
|---|---|---|---|---|
| JP | 2010-277853 A | | 12/2010 | |
| JP | 2015-032373 A1 | | 2/2015 | |
| WO | WO-2011001753 A1 | * | 1/2011 | ....... G02F 1/133605 |
| WO | WO-2011004680 A1 | * | 1/2011 | ............. H05K 1/142 |
| WO | WO-2019230950 A1 | * | 12/2019 | ............. H01R 12/77 |
| WO | WO-2023153697 A1 | * | 8/2023 | ............... H05K 1/18 |

OTHER PUBLICATIONS

Innovation Q+ NPL Search (Year: 2026).*
International Search Report and Written Opinion of PCT Application No. PCT/JP2022/039150, issued on Dec. 27, 2022, 10 pages of ISRWO.

* cited by examiner

*Primary Examiner* — Anabel Ton
(74) *Attorney, Agent, or Firm* — Richard Laperuta

(57) ABSTRACT

An optical device is provided that achieves excellent light emitting performance while including a plurality of light sources disposed at higher density. The light source device includes a substrate, a plurality of light sources, a connecter, and wiring lines. The substrate includes a front surface and a rear surface on an opposite side of the front surface in a thickness direction. The substrate has a through-hole. The plurality of light sources is provided on the front surface of the substrate. The connecter includes a main body inserted in the through-hole of the substrate and a plurality of first terminals provided on the main body. The wiring lines each couple corresponding one of the plurality of light sources and corresponding one of the plurality of first terminals to each other. The wiring lines are provided on the front surface.

20 Claims, 16 Drawing Sheets

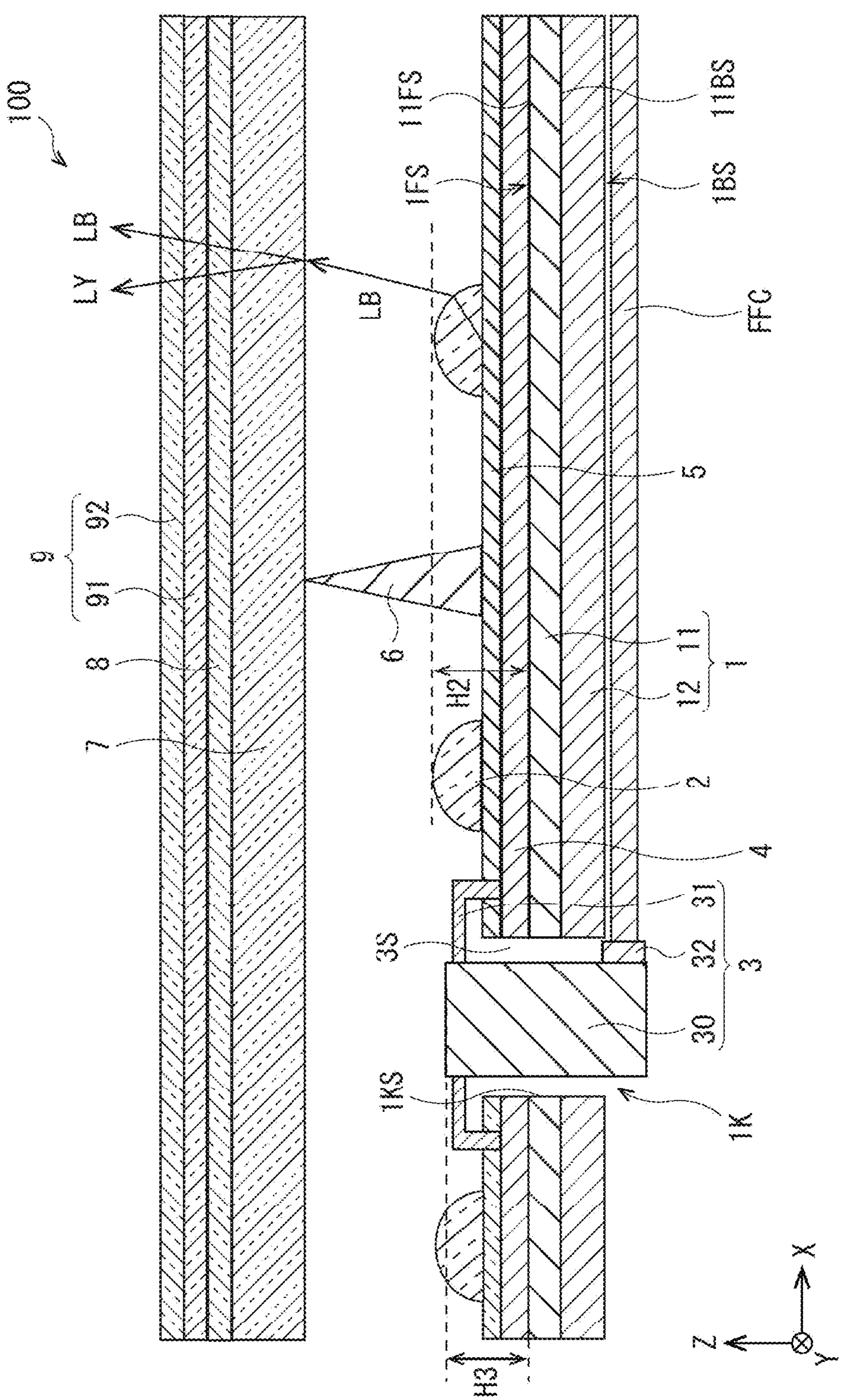
[FIG. 1]
100
LB
LY
LB
11FS
1FS
11BS
1BS
FFC
5
9
92
91
8
7
6
H2
11
12
1
2
4
31
32
3
30
3S
1KS
1K
H3
X
Y
Z

[ FIG. 2 ]
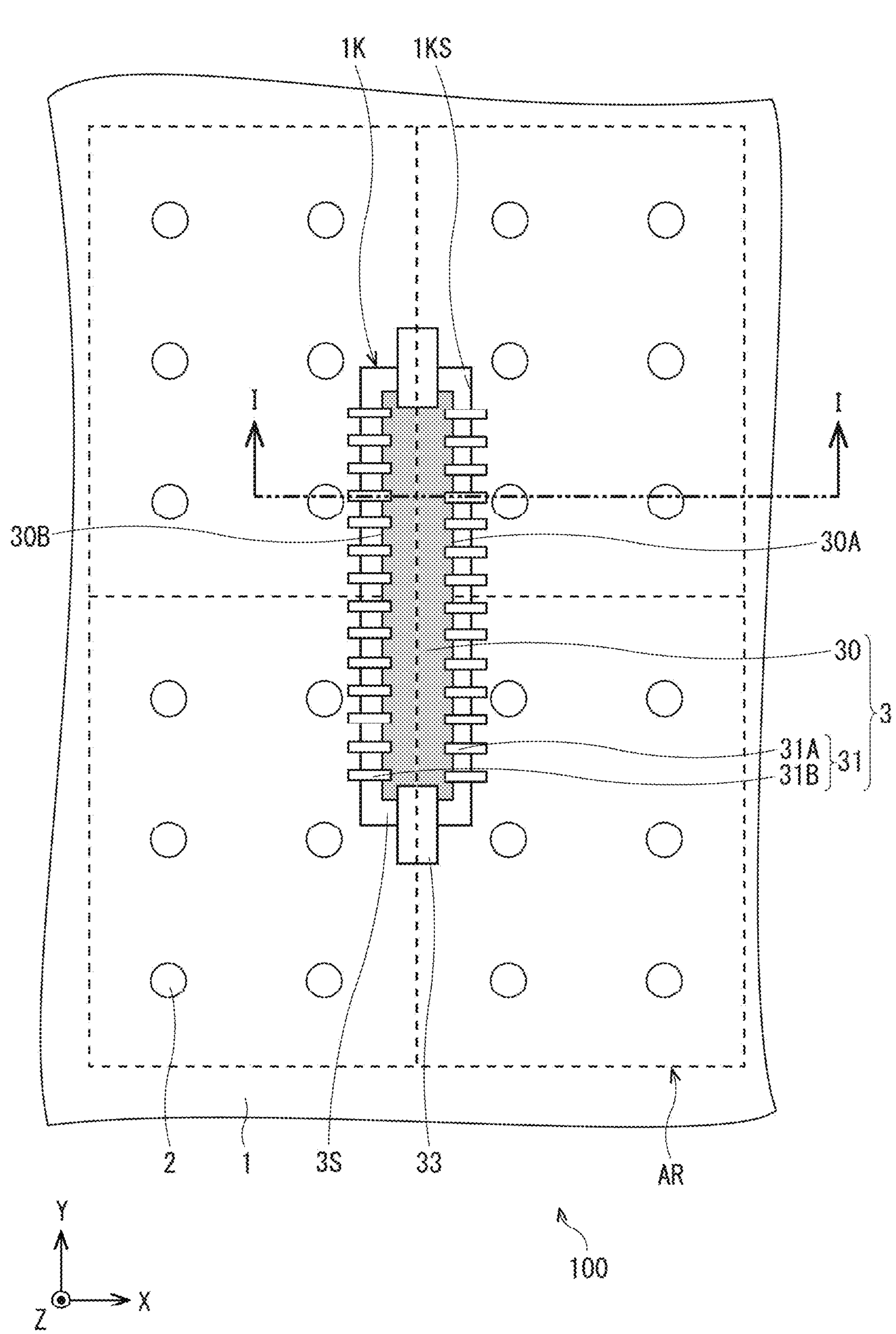

[ FIG. 3 ]
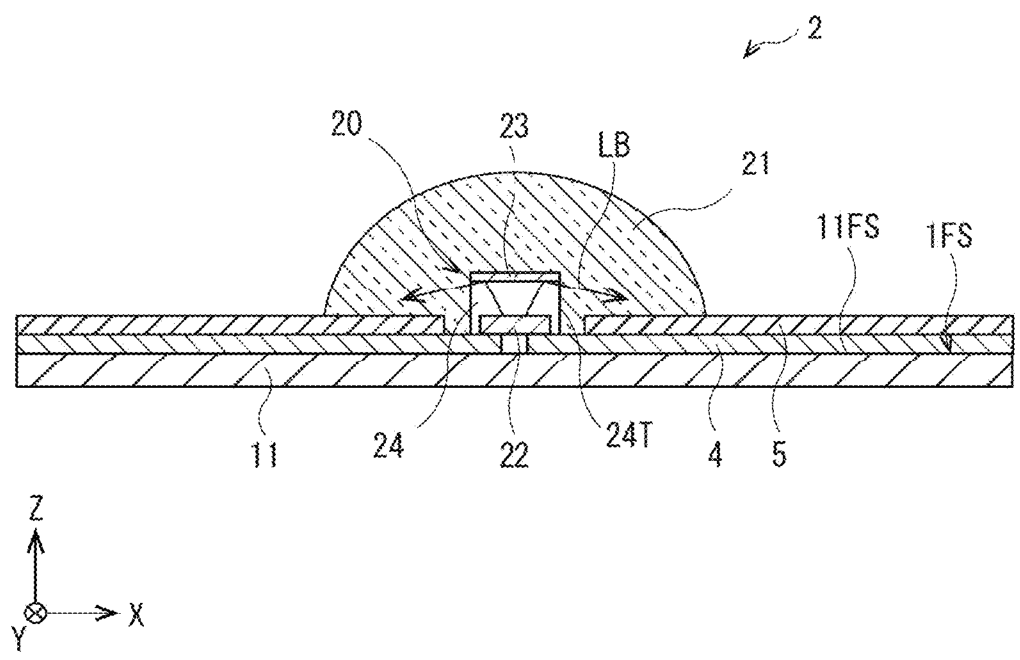
[ FIG. 4 ]
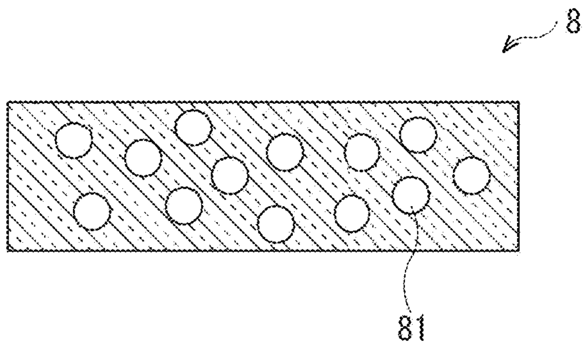

[ FIG. 5 ]
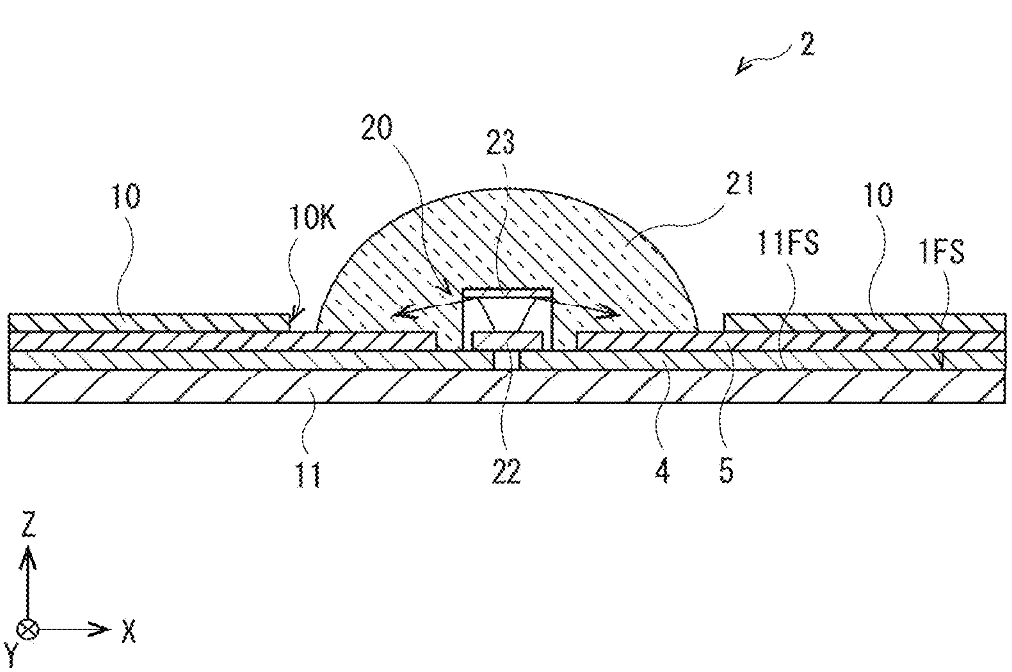

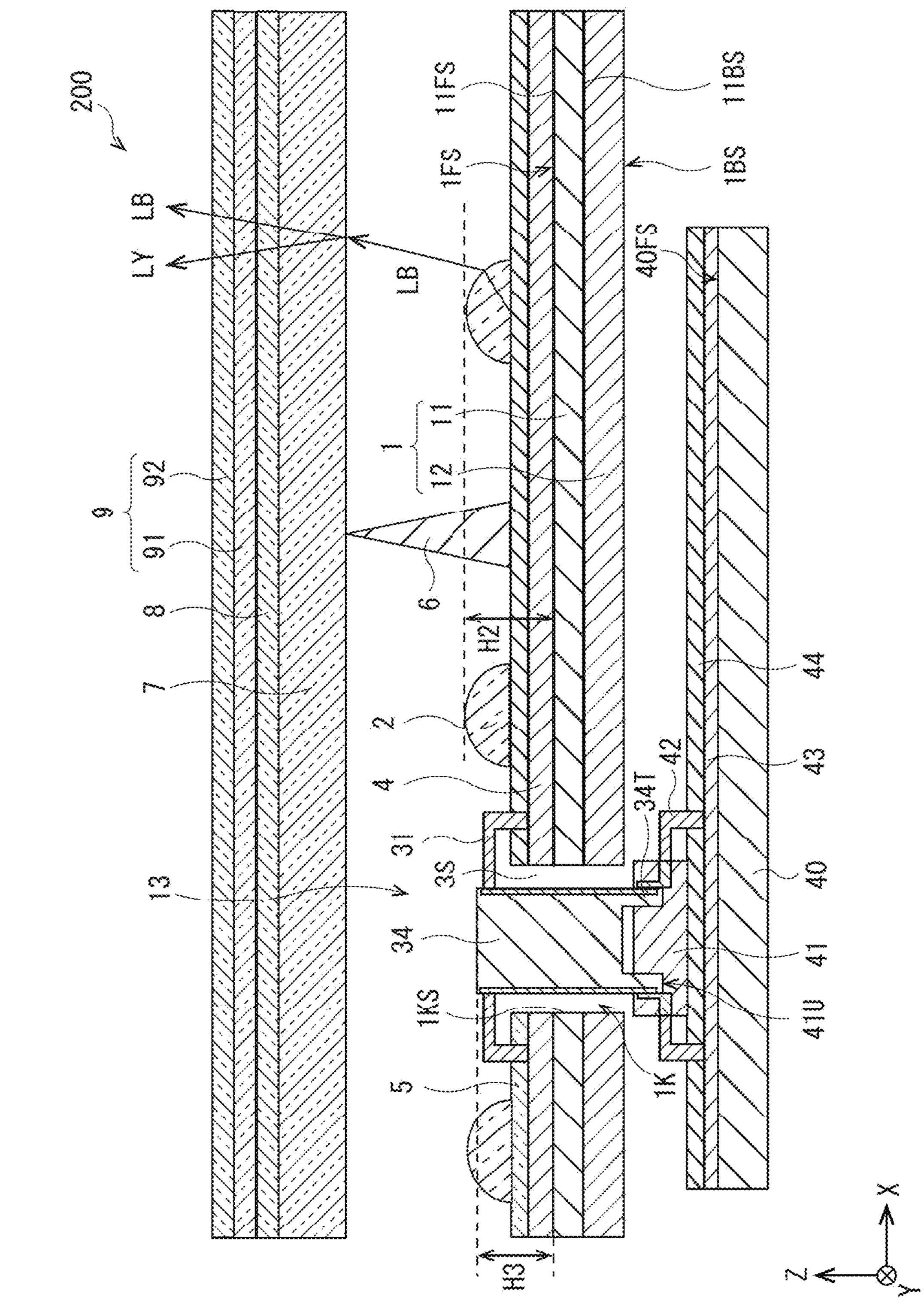
[FIG. 6]
200
LY
LB
LB
1FS
11FS
11BS
1BS
40FS
1
11
12
9
91
92
8
7
6
H2
2
4
44
43
42
34T
3I
3S
13
34
41
41U
40
1KS
1K
5
H3
X
Y
Z

[ FIG. 7A ]
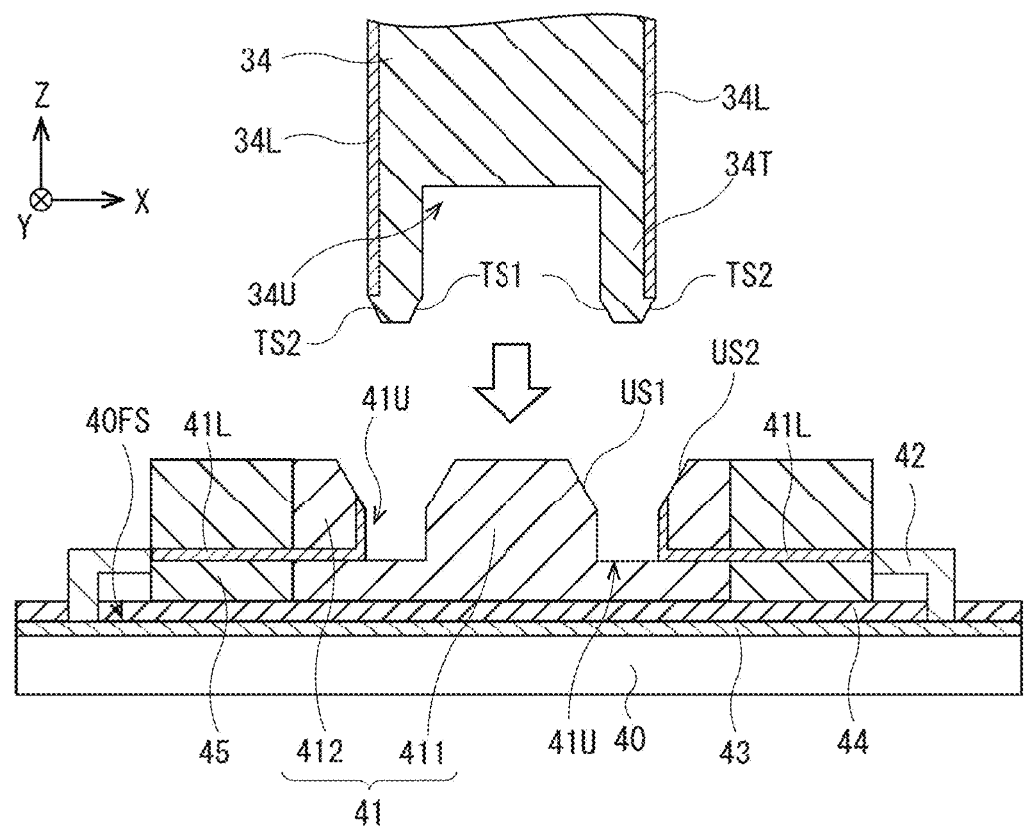
[ FIG. 7B ]
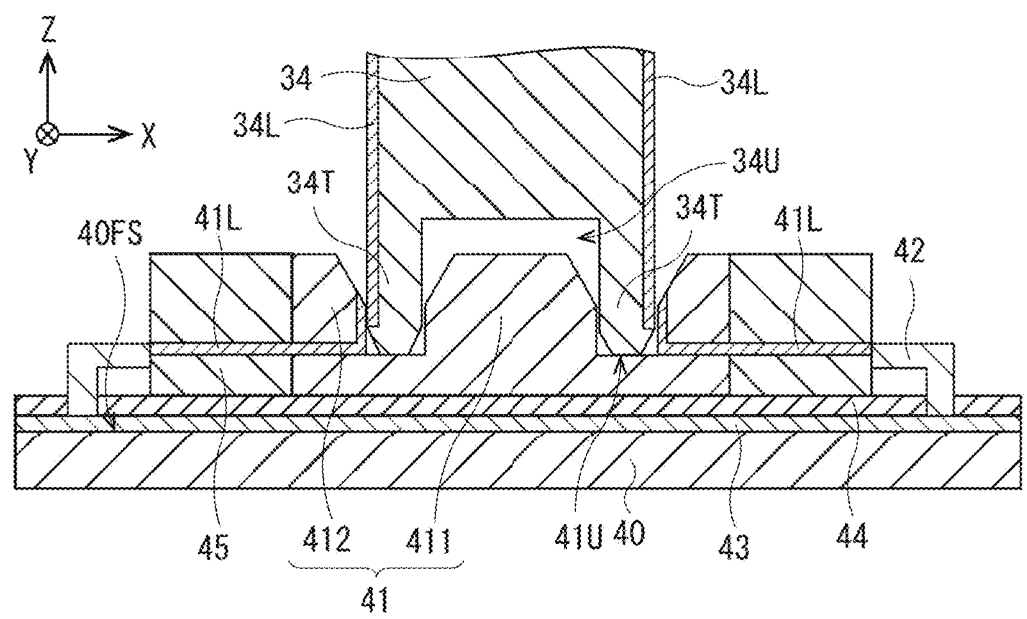

[ FIG. 8A ]
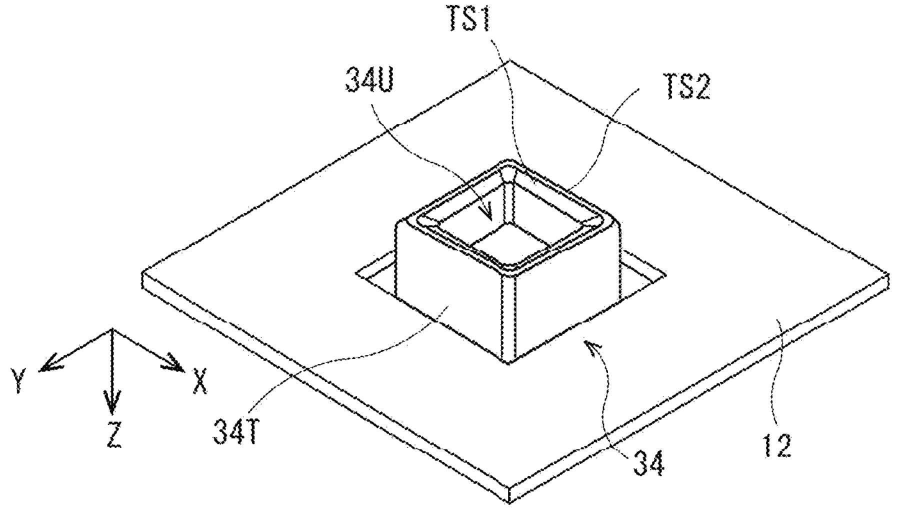
[ FIG. 8B ]
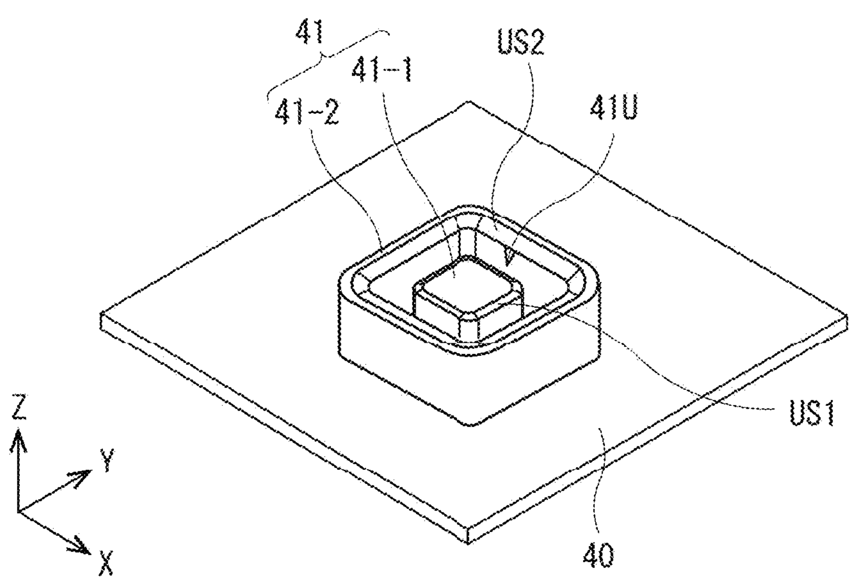

[ FIG. 9A ]
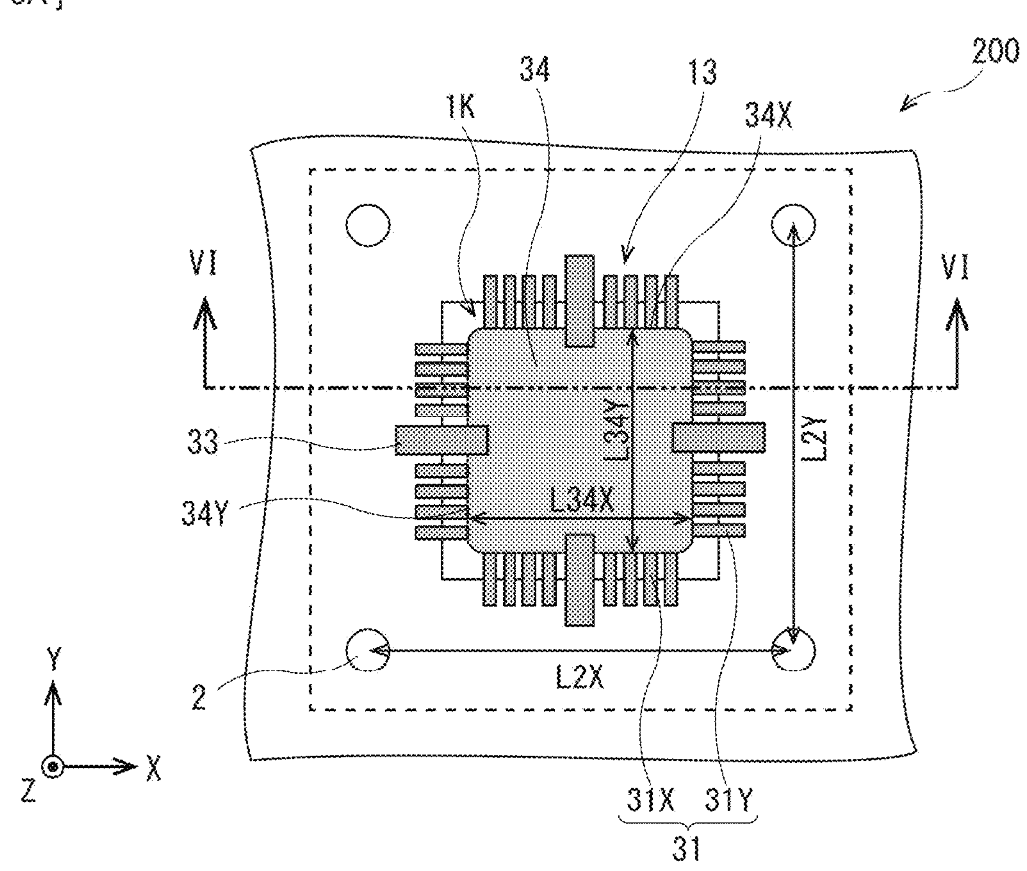

[ FIG. 9B ]
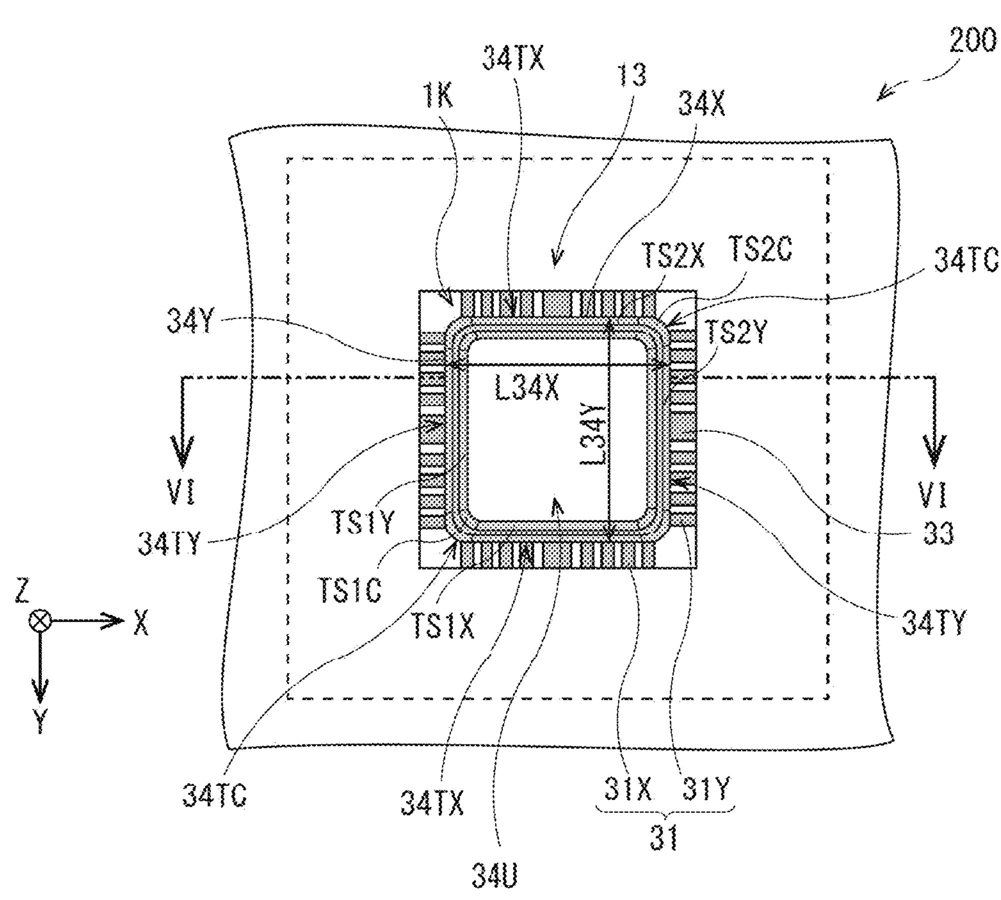

[ FIG. 9C ]
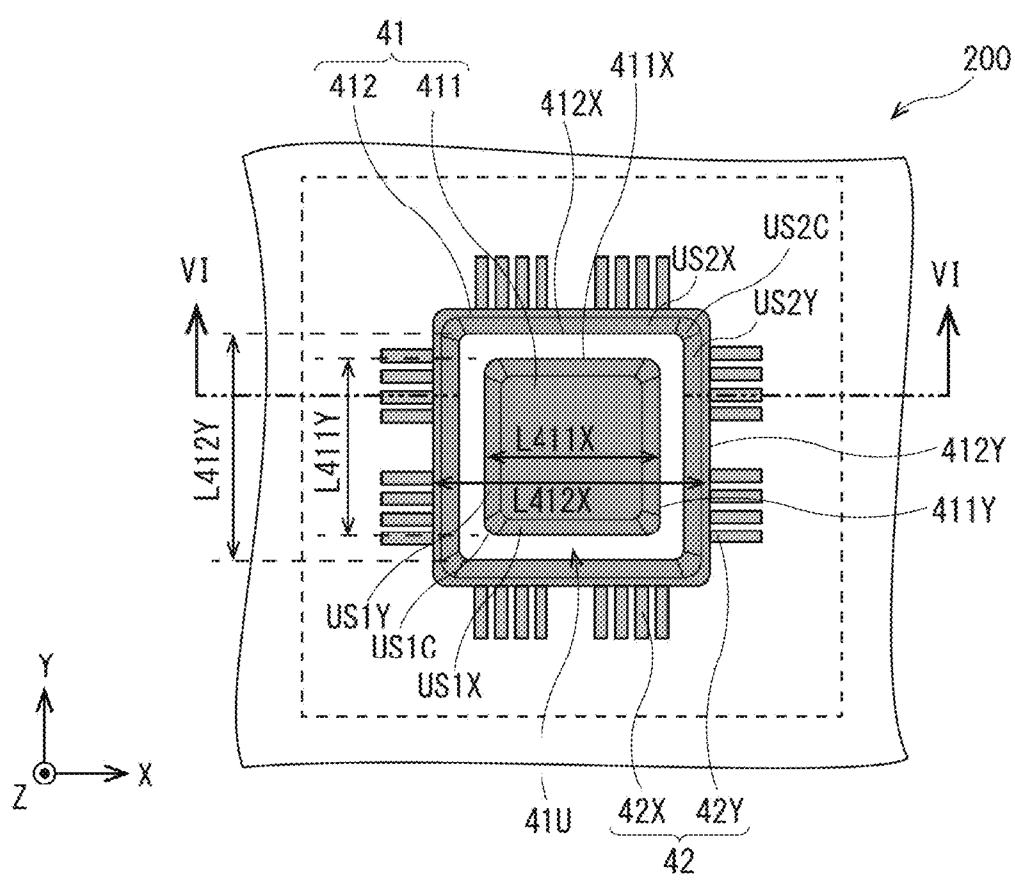

[ FIG. 10 ]
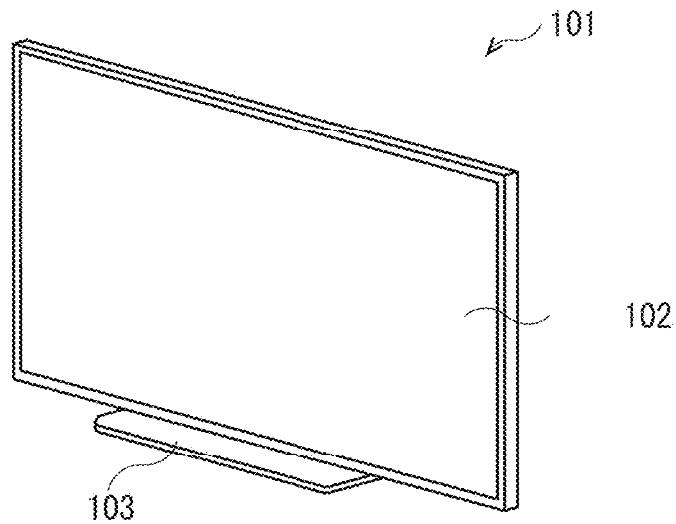

[ FIG. 11 ]
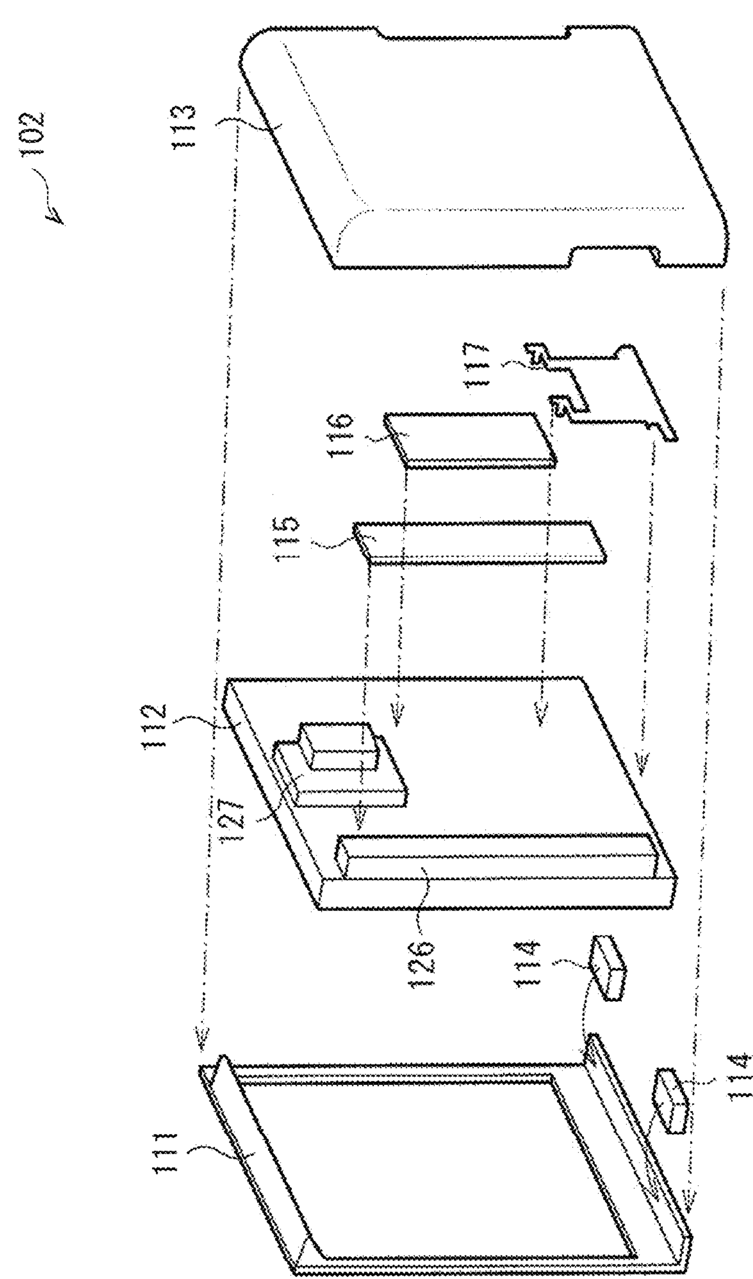

[ FIG. 12 ]
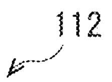
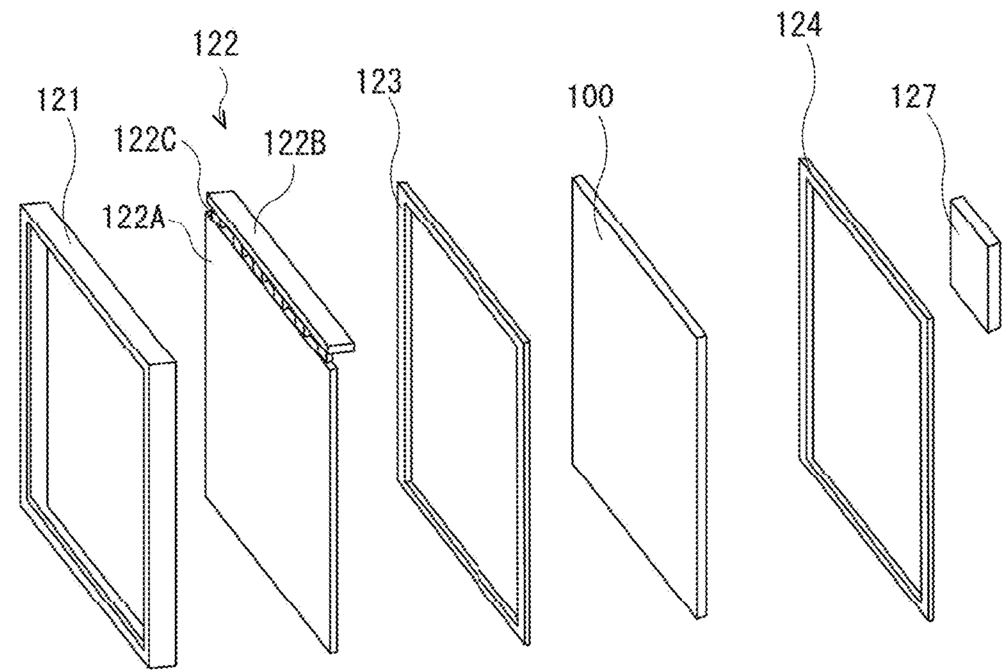

[ FIG. 13 ]
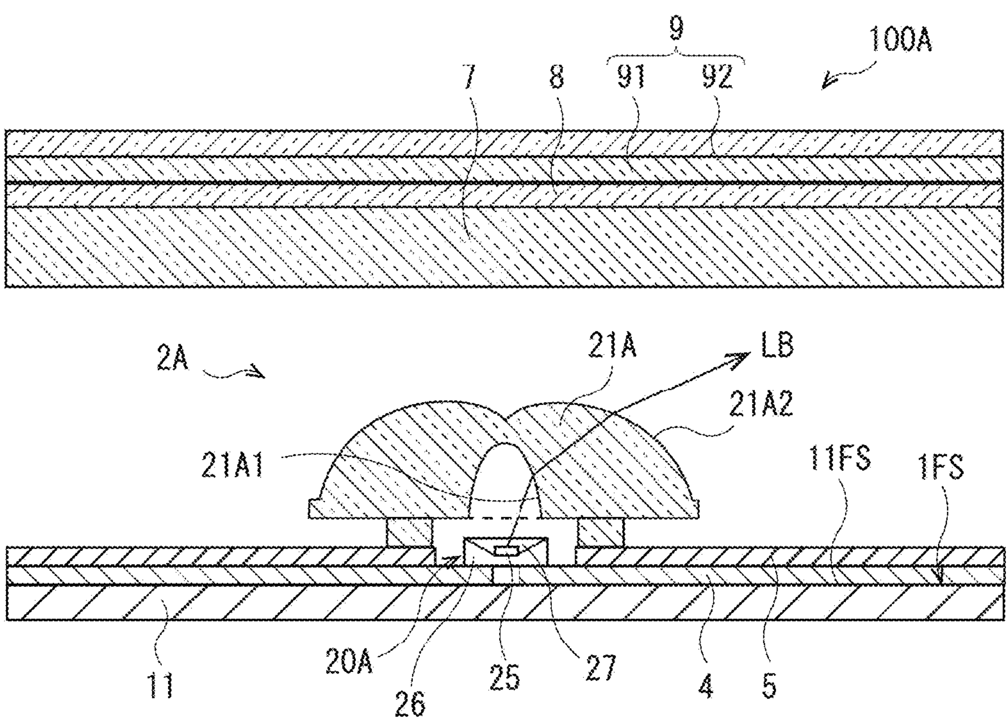
[ FIG. 14 ]
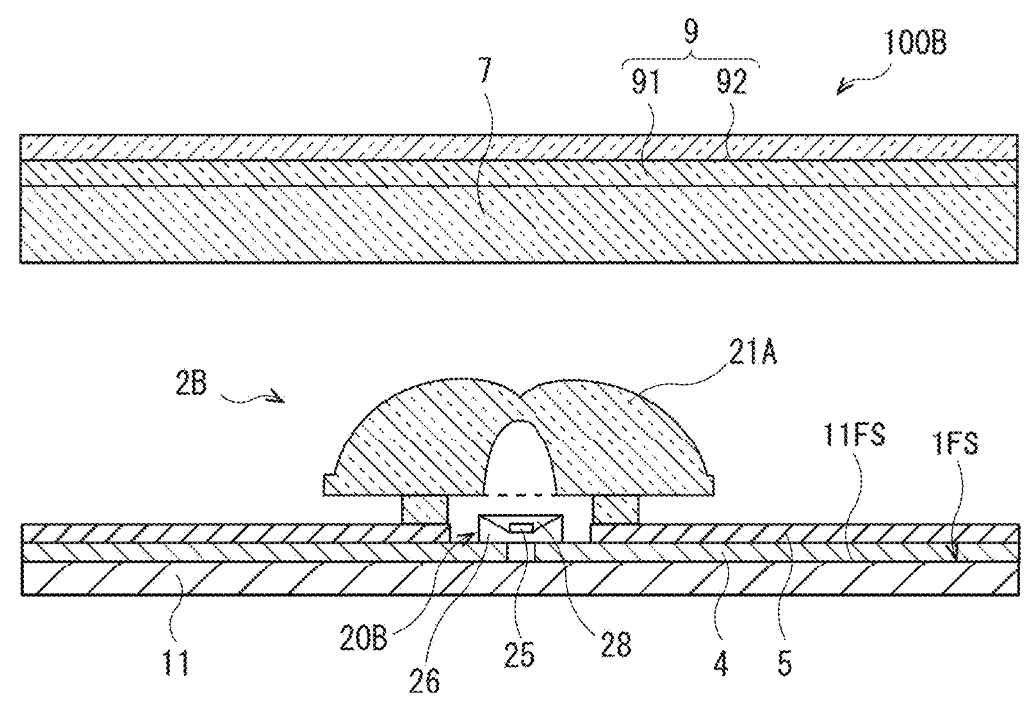

[ FIG. 15 ]
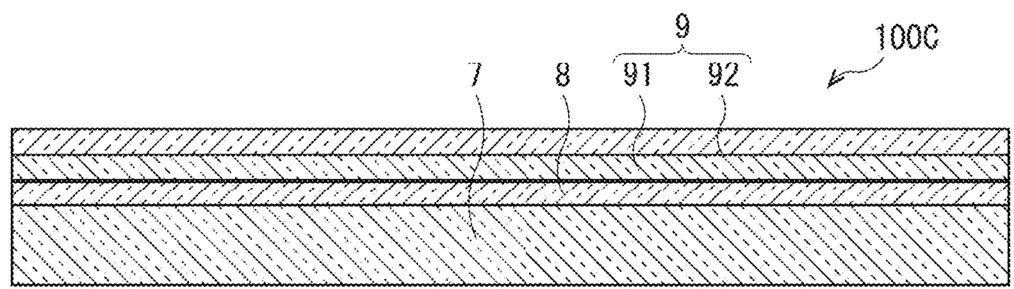
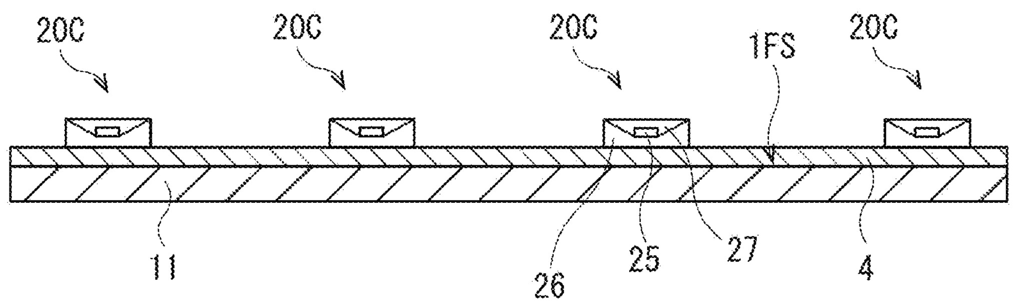
[ FIG. 16 ]
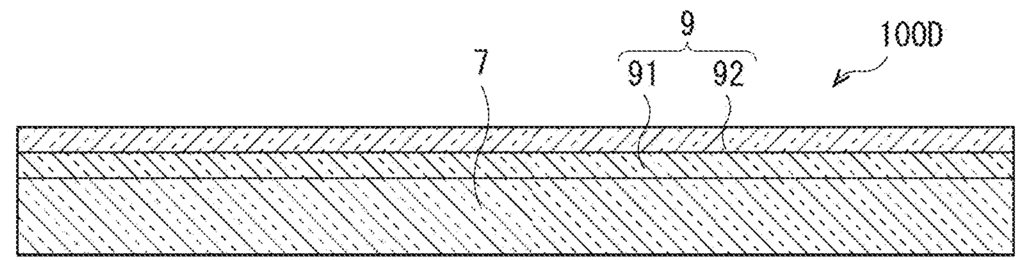
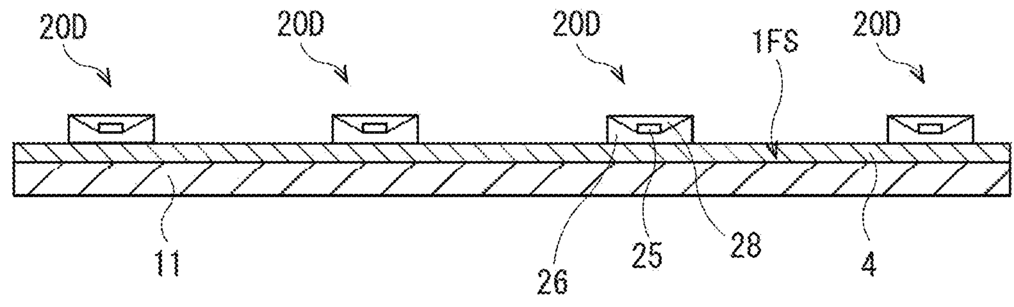

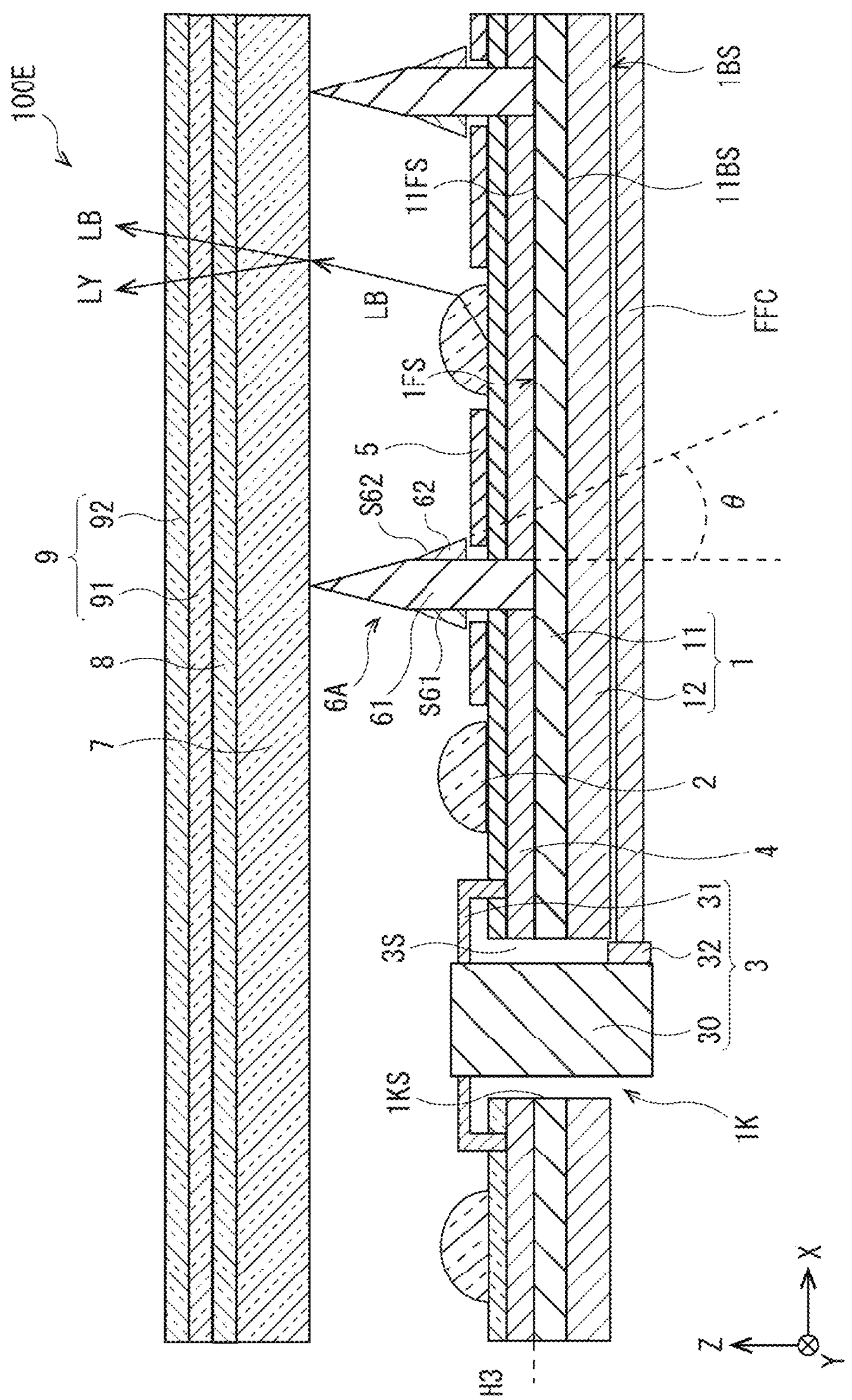
[FIG. 17]

LIGHT SOURCE DEVICE AND DISPLAY

CROSS REFERENCE TO RELATED APPLICATIONS

This application is a U.S. National Phase of International Patent Application No. PCT/JP2022/039150 filed on Oct. 20, 2022, which claims priority benefit of Japanese Patent Application No. JP 2021-199857 filed in the Japan Patent Office on Dec. 9, 2021, which claims priority benefit of Japanese Patent Application No. JP 2022-090950 filed in the Japan Patent Office on Jun. 3, 2022. Each of the above-referenced applications is hereby incorporated herein by reference in its entirety.

TECHNICAL FIELD

The present disclosure relates to a light source device suitable for a surface light source and to a display that displays an image using illumination light by the light source device.

BACKGROUND ART

Until now, for example, as a backlight of a liquid crystal display, a light source device using an LED (light emitting diode) as a light source has been used (for example, refer to NPL 1).

CITATION LIST

Patent Literature

PTL 1: Japanese Unexamined Patent Application Publication No. 2015-032373

SUMMARY OF THE INVENTION

Incidentally, recently, a light source device has been desired in which arranging more light sources per unit area at a narrow pitch makes it possible to adjust a luminance with higher accuracy.

Therefore, an optical device that makes it possible to achieve excellent light emitting performance while including a plurality of light sources disposed at higher density and a display including the same are desired.

A light source device as an embodiment of the present disclosure includes a substrate, a plurality of light sources, a connecter, and wiring lines. The substrate includes a front surface and a rear surface on an opposite side of the front surface in a thickness direction. The first substrate has a through-hole. The plurality of light sources is provided on the front surface. The connecter includes a main body inserted in the through-hole of the substrate and a plurality of first terminals provided on the main body. The wiring lines each couple corresponding one of the plurality of light sources and corresponding one of the plurality of first terminals to each other. The wiring lines are provided on the front surface.

In the light source device as the embodiment of the present disclosure, because the main body of the connecter is provided in the through-hole, it helps to further prevent the connector from blocking traveling of emitted light from the light source. Furthermore, because it is possible to reduce an area occupied by the connecter, within an area occupied by the substrate, it is possible to dispose the connecter even if an arrangement interval of the plurality of light sources is narrow.

BRIEF DESCRIPTION OF THE DRAWINGS

FIG. 1 is a cross-sectional diagram illustrating a configuration example of a light source device according to a first embodiment of the present disclosure.

FIG. 2 is a plan view of a planar configuration of the light source device illustrated in FIG. 1.

FIG. 3 is an enlarged cross-sectional diagram illustrating a configuration example of a light source illustrated in FIG. 1.

FIG. 4 is an enlarged cross-sectional diagram illustrating a configuration example of a wavelength conversion sheet illustrated in FIG. 1.

FIG. 5 is an enlarged cross-sectional diagram illustrating a configuration example of a light source device according to a first modification example of the first embodiment.

FIG. 6 is a cross-sectional diagram illustrating a configuration example of a light source device according to a second embodiment of the present disclosure.

FIG. 7A is a first enlarged cross-sectional diagram enlarging and illustrating a periphery of a connecter of the light source device illustrated in FIG. 6.

FIG. 7B is a second enlarged cross-sectional diagram enlarging and illustrating the periphery of the connecter of the light source device illustrated in FIG. 6.

FIG. 8A is a perspective view of an appearance of a protrusion of the connecter illustrated in FIG. 7A.

FIG. 8B is a perspective view of an appearance of a pedestal illustrated in FIG. 7A.

FIG. 9A is a plan view of a state where the periphery of the connecter illustrated in FIG. 7A is viewed from above.

FIG. 9B is a plan view of a state where the periphery of the connecter illustrated in FIG. 7A is viewed from below.

FIG. 9C is a plan view of a state where a periphery of the pedestal illustrated in FIG. 7A is viewed from above.

FIG. 10 is a perspective view of an appearance of a display according to a third embodiment of the present disclosure.

FIG. 11 is a perspective view of a decomposed state of a main body part illustrated in FIG. 10.

FIG. 12 is a perspective view of a decomposed state of a panel module illustrated in FIG. 11.

FIG. 13 is a cross-sectional diagram illustrating a configuration example of a light source device according to a first modification example that is another modification example of the present disclosure.

FIG. 14 is a cross-sectional diagram illustrating a configuration example of a light source device according to a second modification example that is another modification example of the present disclosure.

FIG. 15 is a cross-sectional diagram illustrating a configuration example of a light source device according to a third modification example that is another modification example of the present disclosure.

FIG. 16 is a cross-sectional diagram illustrating a configuration example of a light source device according to a fourth modification example that is another modification example of the present disclosure.

FIG. 17 is a cross-sectional diagram illustrating a configuration example of a light source device according to a fifth modification example that is another modification example of the present disclosure.

MODES FOR CARRYING OUT THE INVENTION

In the following, embodiments of the present disclosure are described in detail with reference to the drawings. It is to be noted that the description is given in the following order.

1. First Embodiment (first light source device)
2. Second Embodiment (second light source device)
3. Third Embodiment (liquid crystal display)
4. Other Modification Examples

1. First Embodiment

1.1 Configuration

FIG. 1 is a cross-sectional diagram illustrating a configuration example of a light source device 100 according to a first embodiment of the present disclosure. FIG. 2 is a plan view of a portion of a planar configuration of the light source device 100 illustrated in FIG. 1. FIG. 1 corresponds to a cross section in an arrow direction along an I-I cutting line illustrated in FIG. 2. FIG. 3 is an enlarged cross-sectional diagram illustrating a configuration example of a light source 2 illustrated in FIG. 1. The light source device 100 is suitable for a surface light source and is used, for example, as a direct-type backlight mounted on a liquid crystal display.

The light source device 100 includes, for example, a substrate 1 as a first substrate, a plurality of light sources 2, a connecter 3, and a wiring line 4. The substrate 1 has a front surface 1FS and a rear surface 1BS on an opposite side of the front surface 1FS in a thickness direction (Z-axis direction), and a through-hole 1K passing through in the Z-axis direction. This light source device may further include a resin layer 5, a spacer 6, a diffusion sheet 7, a wavelength conversion sheet 8, an optical sheet group 9, and a flexible flat cable FFC.

Note that, in the present embodiment, the thickness direction of the substrate 1 is set as the Z-axis direction, a transverse direction of the connecter 3 is set as an X-axis direction, and a longitudinal direction of the connecter 3 is set as a Y-axis direction.

(Substrate 1)

The substrate 1 includes, for example, a light source substrate 11 and a support substrate 12. The light source substrate 11 is, for example, a resin plate-shaped member or film-shaped member having electrical insulation property and includes a first major surface 11FS and a second major surface 11BS. As the light source substrate 11, a resin film such as polyethylene terephthalate (PET), fluorine, or polyethylene naphthalate (PEN) may be used. Alternatively, as the light source substrate 11, a metal-based substrate including aluminum (Al) or the like having a surface on which a polyimide-based or epoxy-based insulating resin layer or the like is formed may be used. Moreover, as the light source substrate 11, a film base including a glass-containing resin such as a FR4 (glass epoxy resin) or a CEM3 (glass composite resin) may be used.

On the first major surface 11FS, the plurality of wiring lines 4 and the plurality of light sources 2 are mounted. In the example illustrated in FIG. 1, etc., the first major surface 11FS is coincident with the front surface 1FS of the substrate 1. The second major surface 11BS is on an opposite side of the first major surface 11FS in the Z-axis direction. The support substrate 12 is a plate-shaped member that is disposed to face the second major surface 11BS of the light source substrate 11 and supports the light source substrate 11 and the connecter 3. It is desirable that the support substrate 12 includes, for example, a plate-shaped member including a highly rigid material such as stainless steel.

(Light Source 2 and Wiring Line 4)

The plurality of light sources 2 is provided on the front surface 1FS of the substrate 1, that is, the first major surface 11FS. As illustrated in FIG. 2, the plurality of light sources 2 is arranged in a matrix, for example, to spread along the first major surface 11FS. Furthermore, on the first major surface 11FS of the light source substrate 11, the plurality of wiring lines 4 having a predetermined pattern shape is provided to allow for independent light emission control for each one or more light sources 2. The plurality of wiring lines 4 makes it possible to perform local light emission control (local dimming) of the plurality of light sources 2. The light source device 100 is configured to control a light emission intensity or a lighting timing, for example, for each unit region AR indicated by a broken line in FIG. 2. In the example illustrated in FIG. 2, six light sources 2 are disposed in a single unit region AR. However, the present disclosure is not limited to this.

The wiring line 4 may be printed on the light source substrate 11. As a material included in the wiring line 4, for example, copper (Cu), aluminum (Al), silver (Ag), an alloy thereof, or the like is exemplified.

(Connecter 3)

The connecter 3 includes, for example, a main body 30 and a plurality of first terminals 31 provided on the main body 30. The main body 30 is, for example, a member having a substantially rectangular parallelepiped shape in which a transverse direction is in the X-axis direction and a longitudinal direction is in the Y-axis direction on an XY plane. The main body 30 is inserted in the through-hole 1K of the substrate 1. The plurality of wiring lines 4 is each provided to couple corresponding one of the plurality of light sources 2 and corresponding one of the plurality of first terminals 31 to each other.

The connecter 3 further includes a second terminal 32 provided on the main body 30. Note that a plurality of second terminals 32 may be arranged side by side in the Y-axis direction. The second terminal 32 is coupled to, for example, each of a plurality of conductors included in the flexible flat cable FFC.

As described above, the main body 30 of the connecter 3 extends in the Y-axis direction along the front surface 1FS, that is, the first major surface 11FS. Here, the plurality of first terminals 31 is provided on both side portions of the main body 30 in the X-axis direction orthogonal to the Y-axis direction and along the front surface 1FS. In a more specific example, the plurality of first terminals 31 includes a plurality of first terminals 31A arranged side by side in the Y-axis direction on a first side surface 30A of the main body 30 and a plurality of first terminals 31B arranged side by side in the Y-axis direction on a second side surface 30B of the main body 30.

Moreover, it is preferable that an inner wall surface 1KS of the through-hole 1K and the main body 30 of the connecter 3 has a gap 3S therebetween. That is, it is desirable that at least a portion of the main body 30 be apart from the inner wall surface 1KS of the through-hole 1K without being in contact with the inner wall surface 1KS.

Furthermore, as illustrated in FIG. 1, it is preferable that a projection height H3 of the connecter 3 from the front surface 1FS be less than or equal to a projection height H2 of the light source 2 from the front surface 1FS (H3≤H2).

(Resin Layer 5)

The resin layer 5 is, for example, a white resist layer. The resin layer 5 has a relatively high reflectance with respect to light from the light source 2 and light wavelength-converted by the wavelength conversion sheet 8. As the white resist, for example, an inorganic material such as titanium oxide ($TiO_2$) fine particles or barium sulfate ($BaSO_4$) fine particles and an organic material such as porous acrylic resin fine particles or polycarbonate resin fine particles having numerous holes for light scattering are exemplified.

(Details of Light Source 2)

As illustrated in FIG. 3, the light source 2 is a so-called direct-potting-type light source and includes a light emitting element 20 and a sealing lens 21. The light emitting element 20 includes, for example, a semiconductor layer 22 including a light emitting body and a reflection layer 23 that is disposed to be opposed to the semiconductor layer 22 with a transparent layer 24 interposed therebetween in the Z-axis direction.

The transparent layer 24 includes, for example, sapphire, silicon carbide (SiC), or the like. In the semiconductor layer 22, for example, from the side of the transparent layer 24, an n-type semiconductor layer, an active layer, and a p-type semiconductor layer are laminated in order. The n-type semiconductor layer includes, for example, an n-type nitride semiconductor (for example, n-type GaN). The active layer includes, for example, a nitride semiconductor having a quantum well structure (for example, n-type GaN). The p-type semiconductor layer includes, for example, a p-type nitride semiconductor (for example, p-type GaN). The semiconductor layer 22 includes, for example, a blue LED (Light Emitting Diode) that emits blue light (for example, having a wavelength of 440 nm to 460 nm). The reflection layer 23 is provided on a surface on an opposite side of the semiconductor layer 22, of the transparent layer 24. The reflection layer 23 includes a material having a high reflectance. Specifically, the reflection layer 23 includes a silver-deposited film, an aluminum-deposited film, a multi-layer reflection film, or the like.

As illustrated in FIG. 3, in the light emitting element 20, light LB emitted from the active layer of the semiconductor layer 22 is reflected by the reflection layer 23, and thereafter enters the sealing lens 21 from an end surface 24T of the transparent layer 24. The light LB that has entered the sealing lens 21 passes through the sealing lens 21 and is emitted to a surrounding region. Note that, when passing through the sealing lens 21, the light LB receives an optical action.

The sealing lens 21 is, for example, an optical member including a transparent resin such as silicone or acrylic. The sealing lens 21 is configured to cover the entire light emitting element 20 and seal the light emitting element 20. The sealing lens 21 has a refractive index between a refractive index of the semiconductor layer 22 of the light emitting element 20 and a refractive index of air. The sealing lens 21 is adapted to protect the light emitting element 20 and improve an extraction efficiency of light emitted from the light emitting element 20. An outer shape of the sealing lens 21 is not particularly limited as long as an optical action of the sealing lens 21 as a lens for extracting the light LB emitted from the light emitting element 20 is obtainable. For example, the outer shape of the sealing lens 21 is not limited to a shape having a spherical surface and may be a shape including a non-spherical surface. Furthermore, the sealing lens 21 may be configured to control a light distribution direction of the light LB emitted from the light emitting element 20.

Because the light source 2 has the direct-potting type configuration, it is easy to make a shape of the sealing lens 21 be a domical shape having an aspect ratio greater than or equal to 0.2 and less than or equal to one. When the shape of the sealing lens 21 is, particularly, a domical shape of 0.4 to 0.6, luminance uniformity characteristics such as luminance unevenness become preferable. Here, the aspect ratio is a ratio between a height h and a radius r of a dome-type lens shape, i.e., h/r. In a case where the aspect ratio is one, the shape is a hemisphere shape.

(Wavelength Conversion Sheet 8)

The wavelength conversion sheet 8 is disposed to be opposed to the plurality of light sources 2. FIG. 4 is an enlarged cross-sectional diagram enlarging and illustrating a portion of the wavelength conversion sheet 8 illustrated in FIG. 1. As illustrated in FIG. 4, the wavelength conversion sheet 8 includes, for example, a wavelength conversion substance 81 in particle form. The wavelength conversion substance 81 includes, for example, a fluorescent material (fluorescent substance) such as a fluorescent pigment or a fluorescent dye or a quantum dot, is excited by the light from the light source 2, wavelength-converts the light from the light source 2 into light with another wavelength different from an original wavelength by a principle of fluorescence or the like, and releases this. Note that, in FIG. 4, for simplification, the wavelength conversion substance 81 is illustrated in particle form. However, the present disclosure is not limited to the wavelength conversion substance 81 in particle form.

The wavelength conversion substance 81 included in the wavelength conversion sheet 8 absorbs the blue light emitted from the light source 2 and converts a portion of the blue light into red light (for example, having a wavelength of 620 nm to 750 nm) or green light (for example, having a wavelength of 495 nm to 570 nm). In this case, the light of the light source 2 passes through the wavelength conversion sheet 8, and this synthesizes the red light, the green light, and the blue light and generates white light. Alternatively, the wavelength conversion substance 81 included in the wavelength conversion sheet 8 may absorb the blue light and convert a portion of the blue light into yellow light. In this case, the light of the light source 2 passes through the wavelength conversion sheet 8, and this synthesizes the yellow light and the blue light and generates the white light.

It is preferable that the wavelength conversion substance 81 included in the wavelength conversion sheet 8 include the quantum dot. The quantum dot is a particle with a major axis of about 1 nm to 100 nm and has discrete energy levels. Because an energy state of the quantum dot depends on its size, it is possible to freely select a light emission wavelength by varying the size. Furthermore, emitted light of the quantum dot has a narrow spectrum width. By combining the pieces of light with such a sharp peak, a color gamut is expanded. Therefore, by using the quantum dot as the wavelength conversion substance, it is possible to easily expand the color gamut. Moreover, the quantum dot has high responsiveness, and it is possible to efficiently use the light of the light source 2. In addition, the quantum dot also has high stability. The quantum dot is, for example, a compound of a group 12 element and a group 16 element, a compound of a group 13 element and the group 16 element, or a compound of a group 14 element and the group 16 element, and is, for example, CdSe, CdTe, ZnS, CdS, PbS, PbSe, CdHgTe, or the like. Furthermore, a Cd-free quantum dot is requested based on an environment regulation such as the RoHS Directive, and core materials include an InP-based material, Perovskite (Perovskite) $CsPbBr_3$, Zn (Te, Se), or silver indium sulfide that is one of ternary I-III-VI materials.

(Diffusion Sheet 7)

The diffusion sheet 7 is an optical member disposed between the wavelength conversion sheet 8 and the plurality of light sources 2. The diffusion sheet 7 uniformizes an angle distribution of entered light. The diffusion sheet 7 may be a single diffusion plate or a single diffusion sheet, or may include two or more diffusion plates or two or more diffusion sheets. Furthermore, the diffusion sheet 7 may be a plate-shaped optical member having a uniform thickness and a uniform hardness.

(Spacer 6)

The spacer 6 is a member that maintains an optical distance between the light source 2 and the diffusion sheet 7.

(Optical Sheet Group 9)

The optical sheet group 9 is an optical member disposed on a light emission surface side of the wavelength conversion sheet 8, that is, an opposite side of the diffusion sheet 7 viewed from the wavelength conversion sheet 8. The optical sheet group 9 includes, for example, a sheet or a film adapted to improve a luminance. In the example illustrated in FIG. 1, the optical sheet group 9 includes an optical sheet 91 and an optical sheet 92 that are stacked in order on the wavelength conversion sheet 8. The optical sheets 91 and 92 may be bonded to each other and be integrated with each other. The optical sheet 91 is, for example, a prism sheet. The optical sheet 92 is, for example, a reflection-type polarizing film such as a DBEF (Dual Brightness Enhancement Film).

1.2 Workings

In the light source device 100 according to the present embodiment, as illustrated in FIG. 1, a portion of blue light LB emitted from the light source 2 is wavelength-converted (is caused to emit light) by the wavelength conversion substance included in the wavelength conversion sheet 8 to turn into light LY. For example, the wavelength-converted light LY is the red light and the green light, or is the yellow light. The wavelength-converted light LY is evenly reflected in all directions averagely from the wavelength conversion sheet 8 and is emitted therefrom. The blue light LB that has not been absorbed by the wavelength conversion substance 81, of the blue light LB emitted from the light source 2, is also evenly emitted in all directions averagely from the wavelength conversion sheet 8. The blue light LB that has not been absorbed by the wavelength conversion substance 81, of the blue light LB emitted from the light source 2, is emitted from the wavelength conversion sheet 8 as it is. Light traveling forward of the blue light LB that has not been wavelength-converted and light traveling forward of the wavelength-converted light LY are synthesized, and the white light is generated. The generated white light is emitted forward (outside of the light source device).

Furthermore, in the light source device 100 according to the present embodiment, the main body 30 of the connecter 3 is provided in the through-hole 1K. This further helps to prevent the connector 3 from blocking the traveling of the blue light LB that is the emitted light from the light source 2. Therefore, it is possible to easily achieve a desired in-plane luminance distribution on the XY plane. That is, it is possible to control light emission with high accuracy.

Furthermore, by providing the main body 30 of the connecter 3 in the through-hole 1K, as compared with a case where the connecter 3 is provided on the front surface 1FS of the substrate 1, it is possible to reduce an area occupied by the connecter 3 within an area of the substrate 1 on the XY plane. Therefore, even if an arrangement interval of the plurality of light sources 2 is narrow, it is possible to dispose the connecter 3. Therefore, it is possible to evenly distribute the plurality of light sources 2 on the XY plane, and it is possible to make the in-plane luminance distribution more even. Alternatively, this is advantageous for achieving an intended in-plane luminance distribution with high accuracy. Moreover, because it is possible to reduce the area occupied by the connecter 3 within the area occupied by the substrate 1 on the XY plane, the number of positions where it is possible to dispose the connecter 3 increases in the substrate 1. This improves a degree of freedom in design.

Furthermore, in the light source device 100 according to the present embodiment, the connecter 3 further includes the second terminal 32 provided on a rear surface side of the main body 30, and the second terminal 32 is coupled to the flexible flat cable FFC on the rear surface 1BS of the substrate 1. Therefore, for example, as compared with a configuration in which the wiring line 4 and the flexible flat cable FFC are coupled to each other on the front surface 1FS, assembly is easier. Furthermore, in the configuration in which the wiring line 4 and the flexible flat cable FFC are coupled to each other on the front surface 1FS, the connecter itself becomes an obstacle that blocks the traveling of the blue light LB from the light source 2 or a cause that narrows a space where the light source 2 is placeable. In contrast, the light source device 100 according to the present embodiment makes it possible to solve such an issue, and is advantageous in reducing the thickness of the entire device.

Furthermore, in a case where the projection height H3 of the connecter 3 from the front surface 1FS is less than or equal to the projection height H2 of the light source 2 from the front surface 1FS (H3≤H2), it is advantageous in reducing the thickness of the entire device.

Furthermore, in the light source device 100 according to the present embodiment, the main body 30 of the connecter 3 extends in the Y-axis direction along the front surface 1FS (first major surface 11FS), and the plurality of first terminals 31 is arranged side by side in the Y-axis direction in the both side portions (the first side surface 30A and the second side surface 30B) of the main body 30 in the X-axis direction. Therefore, as compared with a case where the first terminals are provided only in one side portion of the main body 30, it is possible to save a space. Furthermore, because the plurality of wiring lines 4 that each couple corresponding one of the plurality of light sources 2 and corresponding one of the plurality of first terminals 31 to each other is disposed on both sides of the connecter 3, as compared with a case where the wiring lines 4 are disposed only on one side of the connecter 3, a pattern shape of a layout of the wiring lines 4 is more simplified. Moreover, because it is also possible to increase a distance between the plurality of light sources 2 and the main body 30 of the connecter 3 in the X-axis direction, it is possible to suppress an influence of a height of the main body 30 in the Z-axis direction, on the emitted light from the light source 2. As a result, it is possible to reduce the luminance unevenness on a screen that can degrade evenness of the emitted light from the light source 2 due to a shadow of light projected on the main body 30 of the connecter 3.

In the light source device 100 according to the present embodiment, if the inner wall surface 1KS of the through-hole 1K and the main body 30 of the connecter 3 has the gap 3S therebetween, that is, if at least a portion of the main body 30 is apart from the inner wall surface 1KS without being in contact with the inner wall surface 1KS, it is easier to avoid unintended electrical short circuit between the connecter 3 and the wiring line 4.

1.3 Effects

As described above, according to the light source device 100 of the present embodiment, it is possible to achieve excellent luminescent performance while disposing the plurality of light sources at high density. Furthermore, it is possible to allow for easy assembly.

1.4 Modification Example of First Embodiment

First Modification Example

FIG. 5 illustrates a configuration example of a light source device according to a first modification example of the first embodiment. A configuration of the first modification example is the same as the configuration of the light source device 100 according to the first embodiment, except that a reflection sheet 10 is further included. In the first modification example illustrated in FIG. 5, the reflection sheet 10 is selectively provided on the resin layer 5. More specifically, the reflection sheet 10 is provided in a region other than a region where the plurality of light sources 2 is provided, within the front surface 1FS.

The reflection sheet 10 has a high reflectance with respect to the light LB from the light source 2 and the light LY wavelength-converted by the wavelength conversion sheet 8. The reflection sheet 10 may include Ag, as a material having a high reflectance. The reflection sheet 10 has a through-hole 10K in which the light source 2 is to be disposed. The resin layer 5 is exposed in an in-plane region having the through-hole 10K, and the exposed resin layer 5 is covered with the sealing lens 21 of the light source 2.

In this way, the light source device according to the first modification example further includes the reflection sheet 10. Therefore, return light reflected by the wavelength conversion sheet 8 or the optical sheet group 9, of the light LB and the light LY, is reflected by the reflection sheet 10 and is used as recycle light to generate white light. Therefore, it is possible to improve a luminance of the entire light source device.

2. Second Embodiment

2.1 Configuration

FIG. 6 is a cross-sectional diagram illustrating a configuration example of a light source device 200 according to a second embodiment of the present disclosure. Similarly to the light source device 100 described above in the first embodiment, the light source device 200 is suitable for a surface light source and is used, for example, as a direct-type backlight mounted on a liquid crystal display.

The light source device 200 includes a connecter 13 instead of the connecter 3. The connecter 13 includes a main body 34 instead of the main body 30. Moreover, the light source device 200 includes a circuit board 40 as a second substrate, instead of the flexible flat cable FFC. A configuration of the light source device 200 is basically the same as the configuration of the light source device 100, except for the above different points. Therefore, in the following description, a portion of the light source device 200 different from the light source device 100 is mainly described. Components of the light source device 200 substantially the same as the components of the light source device 100 are denoted with the same reference numerals, and description of the components is appropriately omitted.

The circuit board 40 is a plate-shaped member or a film-shaped member, for example, including a resin electrical insulation material, and it is possible to use the circuit board 40 including a material similar to that included in the light source substrate 11. The circuit board 40 includes an opposing surface 40FS that is opposed to the rear surface 1BS of the substrate 1. A plurality of wiring lines 43 is mounted on the opposing surface 40FS, and a resin layer 44 is provided on the wiring lines 43. The wiring line 43 may be printed on the circuit board 40. As a material included in the wiring line 43, for example, copper, (Cu), aluminum (Al), silver (Ag), an alloy thereof, or the like is exemplified.

A pedestal 41 is provided on the opposing surface 40FS of the circuit board 40. Moreover, a plurality of second terminals 42 is provided to couple the pedestal 41 and the plurality of wiring lines 43. The pedestal 41 is an engagement member that is engageable with the connecter 13. The main body 34 of the connecter 13 includes a protrusion 34T as a first engagement part provided at a position opposed to the pedestal 41. Meanwhile, the pedestal 41 has a recess 41U as a second engagement part that is engageable with the protrusion 34T. Note that, in the present embodiment, a case is illustrated where the protrusion 34T of the main body 34 of the connecter 13 is a plug and the pedestal 41 is a receptacle. However, the present disclosure is not limited to this, and a relationship between the plug and the receptacle may be opposite.

FIGS. 7A and 7B are enlarged cross-sectional diagrams enlarging and illustrating a periphery of the main body 34 of the connecter 13 of the light source device 200 and the pedestal 41. FIG. 7A illustrates a state before the main body 34 and the pedestal 41 are engaged with each other, that is, a state where the main body 34 and the pedestal 41 are apart from each other. FIG. 7B illustrates a state where the main body 34 and the pedestal 41 are engaged with each other. As illustrated in FIGS. 7A and 7B, a plurality of leads 34L is provided on side surfaces of the main body 34. The plurality of leads 34L are each coupled to corresponding one of the plurality of first terminals 31. Furthermore, the pedestal 41 is provided with a plurality of leads 41L each coupled to corresponding one of the plurality of second terminals 42. A portion of each of the plurality of leads 41L is exposed on an inner side surface of the recess 41U of the pedestal 41. Note that positions of the leads 34L and 41L are not limited to the positions illustrated in FIGS. 7A and 7B, etc., and may be set to any positions.

In the light source device 200, from the separated state in FIG. 7A, for example, the main body 34 moves in a −Z direction and approaches the pedestal 41, and the protrusion 34T of the main body 34 is inserted into the recess 41U of the pedestal 41. This engages the protrusion 34T and the recess 41U with each other. As a result, the state transitions to the engaged state illustrated in FIG. 7B. Furthermore, a protection part 45 may be provided on an outer side of the pedestal 41. When the protrusion 34T is inserted into the recess 41U, the protection part 45 allows for protection to prevent the protrusion 34T from being removed from the pedestal 41 and damaging the wiring line 43 or the like around the pedestal 41. In the engaged state illustrated in FIG. 7B, the leads 34L and the leads 41L come into contact with each other. This results in conduction between the wiring line 4 provided on the light source substrate 11 and the wiring line 43 provided on the circuit board 40 via the first terminals 31 and the second terminals 42.

FIG. 8A is a perspective view of an appearance of the protrusion 34T and illustrates a state where the main body 34 of the connecter 13 is viewed upward from obliquely below. In FIG. 8A, illustration of components other than the main body 34 and the support substrate 12 is omitted. FIG. 8B is a perspective view of an appearance of the pedestal 41 and illustrates a state where the pedestal 41 is viewed downward from obliquely above. In FIG. 8B, illustration of components other than the pedestal 41 and the circuit board 40 is omitted.

As illustrated in FIG. 8A, for example, the protrusion 34T is provided to stand toward the pedestal 41 to go around along an outer edge of the main body 34, and a recess 34U is provided on an inner side of the protrusion 34T. Meanwhile, as illustrated in FIG. 8B, the pedestal 41 includes an inner portion 411 and an outer portion 412. The outer portion 412 is provided to stand toward the main body 34 to go around along an outer edge of the pedestal 41. The inner portion 411 is a columnar portion provided to stand in a middle region surrounded by the outer portion 412. In the pedestal 41, a gap between the inner portion 411 and the outer portion 412 serves as the recess 41U. Therefore, as illustrated in FIG. 7B, in the engaged state where the main body 34 is and the pedestal 41 are engaged with each other, the inner portion 411 is inserted in the recess 34U of the main body 34.

FIG. 9A is a plan view of a state where the periphery of the connecter 13 is viewed in the −Z direction from above. FIG. 9B is a plan view of a state where the periphery of the connecter 13 is viewed in a +Z direction from below. FIG. 9C is a plan view of a state where the periphery of the pedestal 41 is viewed in the −Z direction from above.

As illustrated in FIG. 9A, the outer edge of the main body 34 of the connecter 13 has a substantially rectangular plane shape on the XY plane orthogonal to the thickness direction (Z-axis direction). The main body 34 has an outline including a first side 34X along the X-axis direction and a second side 34Y along the Y-axis direction on the XY plane. The term "substantially" here means, for example, to include a rounded rectangle having an outline including rounded corners, as illustrated in FIG. 9A. Moreover, the term means that it is not limited to a case where the first side 34X and the second side 34Y are strictly orthogonal to each other and includes a case where they are inclined at several degrees. The first side 34X has a length L34X. The second side 34Y has a length L34Y. A plurality of first terminals 31X is arranged along the first side 34X at predetermined intervals, and a plurality of first terminals 31Y is arranged along the second side 34Y at predetermined intervals. Note that, in the present embodiment, as illustrated in FIG. 9B, a shape and a size of an outer edge of the protrusion 34T of the main body 34 match a shape and a size of the outer edge of the main body 34, on the XY plane. Therefore, the outer edge of the protrusion 34T of the main body 34 has a substantially rectangular plane shape on the XY plane. The outer edge of the protrusion 34T of the main body 34 has an outline including the first side 34X along the X-axis direction and the second side 34Y along the Y-axis direction, on the XY plane. Here, a ratio of the length L34Y of the second side 34Y to the length L34X of the first side 34X, that is, a ratio (L34Y/L34X) may be greater than or equal to 0.5 and less than or equal to 1.5, and may preferably be greater than or equal to 0.7 and less than or equal to 1.3. In particular, it is preferable that the length L34X and the length L34Y substantially match each other.

As illustrated in FIG. 9C, the recess 41U of the pedestal 41 has a substantially rectangular plane shape on the XY plane. Specifically, an outer edge of the inner portion 411 has a substantially rectangular plane shape having a length L411X along the X-axis direction and a length L411Y along the Y-axis direction, on the XY plane. Here, a ratio of the length L411Y to the length L411X, that is, a ratio (L411Y/L411X) may be greater than or equal to 0.5 and less than or equal to 1.5, and may preferably be greater than or equal to 0.7 and less than or equal to 1.3. In particular, it is preferable that the length L411X and the length L411Y substantially match each other. Moreover, an inner edge of the outer portion 412 has a substantially rectangular plane shape having a length L412X along the X-axis direction and a length L412Y along the Y-axis direction, on the XY plane. Here, a ratio of the length L412Y to the length L412X, that is, a ratio (L412Y/L412X) may be greater than or equal to 0.5 and less than or equal to 1.5, and may preferably be greater than or equal to 0.7 and less than or equal to 1.3. In particular, it is preferable that the length L412X and the length L412Y substantially match each other.

In this way, the outer edge of the protrusion 34T has an outline closer to a square shape, and this makes it possible to dispose more first terminals 31 around the main body 34, than when it is not the case. Similarly, the recess 41U of the pedestal 41 has an outline closer to a square shape, and this makes it possible to dispose more second terminals 42 around the pedestal 41, than when it is not the case. Furthermore, by setting each of the ratio (L34Y/L34X), the ratio (L411Y/L411X), and (L412Y/L412X) to be greater than or equal to 0.5 and or less than or equal to 1.5, it is possible to more easily and smoothly engage the main body 34 and the pedestal 41 with each other even if alignment accuracy between the main body 34 and the pedestal 41 on the XY plane is not very high, than when it is not the case.

Furthermore, as illustrated in FIG. 9A, the plurality of light sources 2 is arranged at a first pitch L2X along the first side 34X of the main body 34 and at a second pitch L2Y along the second side 34Y. Here, a ratio of the second pitch L2Y to the first pitch L2X may substantially match the ratio of the length L34Y of the second side 34Y to the length L34X of the first side 34X. One reason for this is that it is possible to dispose the connecter 13 in a region between the plurality of light sources 2 and to reduce an occupied area of the connecter 13. In particular, it is preferable that the first pitch L2X and the second pitch L2Y substantially match each other.

Furthermore, as illustrated in FIGS. 7A, 7B, and 8B, at a tip portion of the protrusion 34T, an inward inclined surface TS1 and an outward inclined surface TS2 are provided. Meanwhile, in an upper portion of the recess 41U of the pedestal 41, an inclined surface US1 and an inclined surface US2 are provided. In more detail, within an inner portion 41-1, a portion of an outer surface forming the recess 41U serves as the inclined surface US1, and within an outer portion 41-2, a portion of the inner surface forming the recess 41U serves as the inclined surface US2. By providing such inclined surfaces TS1 and TS2 and such inclined surfaces US1 and US2, when the main body 34 and the pedestal 41 are engaged with each other, for example, the protrusion 34T is smoothly guided to a lower portion of the recess 41U while a portion of the inclined surface TS1 of the protrusion 34T abuts on the inclined surface US1 and a portion of the inclined surface TS2 of the protrusion 34T abuts on the inclined surface US2. That is, even if the alignment accuracy between the main body 34 and the pedestal 41 on the XY plane is not very high, it is possible to easily and smoothly engage the main body 34 and the pedestal 41 with each other. In particular, as described above, the protrusion 34T has the plane shape of the outline closer to a square shape, and this makes it easier to secure a larger area of the inclined surfaces TS1 and TS2 along four sides, than when it is not the case. Similarly, the recess 41U has the plane shape of the outline closer to a square shape, and this makes it easier to secure a larger area of the inclined surfaces US1 and US2 along four sides, than when it is not the case. Therefore, it is possible to more easily and smoothly engage the main body 34 and the pedestal 41 with each other.

Furthermore, as illustrated in FIG. 9B, the protrusion 34T includes a first wall portion 34TX along the first side 34X, a second wall portion 34TY along the second side 34Y, and a corner portion 34TC where the first wall portion 34TX and the second wall portion 34TY intersect. The first wall portion 34TX includes an inclined surface portion TSIX forming a portion of the inclined surface TS1 and an inclined surface portion TS2X forming a portion of the inclined surface TS2. The second wall portion 34TY includes an inclined surface portion TS1Y forming a portion of the inclined surface TS1 and an inclined surface portion TS2Y forming a portion of the inclined surface TS2. The corner portion 34TC includes an inclined surface portion TS1C forming a portion of the inclined surface TS1 and an inclined surface portion TS2C forming a portion of the inclined surface TS2. Here, the inclined surface portion TSIX, the inclined surface portion TS1Y, and the inclined surface portion TS1C are not parallel to each other, and the inclined surface portion TS2X, the inclined surface portion TS2Y, and the inclined surface portion TS2C are not parallel to each other.

Furthermore, as illustrated in FIG. 9C, the inclined surface US1 of the inner portion 411 forming the recess 41U includes an inclined surface portion US1X along a first side 411X, an inclined surface portion US1Y along a second side 411Y, and an inclined surface portion US1C intersecting with both of the inclined surface portions US1X and US1Y. Here, the inclined surface portion US1C is not parallel to both of the inclined surface portions US1X and US1Y. Moreover, the inclined surface US2 of the outer portion 412 forming the recess 41U includes an inclined surface portion US2X along a first side 412X, an inclined surface portion US2Y along a second side 412Y, and an inclined surface portion US2C intersecting with both of the inclined surface portions US2X and US2Y. Here, the inclined surface portion US2C is not parallel to both of the inclined surface portions US2X and US2Y.

2.2 Effects

As described above, according to the light source device 200 of the present embodiment, similarly to the light source device 100 described above in the first embodiment, it is possible to achieve excellent light emitting performance while disposing the plurality of light sources at higher density. Furthermore, it is possible to allow for easy assembly.

3. Third Embodiment

FIG. 10 illustrates an appearance of a display 101 according to a third embodiment of the present technology. The display 101 includes the light source device 100, is used, for example, as a flat-screen television, and has a configuration in which a planar plate-shaped main body part 102 for image display is supported by a stand 103. Note that, although the display 101 is used as a stationary type by placing the display 101 on a horizontal plane such as a floor, a shelf, or a rack in a state where the stand 103 is attached to the main body part 102, it is possible to use the display 101 as a wall-mounted type in a state where the stand 103 is detached from the main body part 102.

FIG. 11 illustrates a decomposed state of the main body part 102 illustrated in FIG. 10. The main body part 102 includes, for example, a front exterior member (bezel) 111, a panel module 112, and a rear exterior member (rear cover) 113 in this order from a front surface side (viewer side). The front exterior member 111 is a frame-shaped member that covers a front periphery portion of the panel module 112, and a pair of speakers 114 is disposed below the front exterior member 111. The panel module 112 is fixed to the front exterior member 111. A power supply substrate 115 and a signal substrate 116 are mounted on a back surface of the panel module 112, and an attachment bracket 117 is fixed to the back surface of the panel module 112. The attachment bracket 117 is adapted to attach a wall-mounted bracket, attach a substrate or the like, and attach the stand 103. The rear exterior member 113 covers the back surface and side surfaces of the panel module 112.

FIG. 12 illustrates a decomposed state of the panel module 112 illustrated in FIG. 11. The panel module 112 includes, for example, a front housing (top chassis) 121, a liquid crystal panel 122, a frame-shaped member (middle chassis) 123, the light source device 100, a rear housing (back chassis) 124, and a timing controller substrate 127 in this order from the front surface side (viewer side).

The front housing 121 is a frame-shaped metal component that covers a front surface periphery portion of the liquid crystal panel 122. The liquid crystal panel 122 includes, for example, a liquid crystal cell 122A, a source substrate 122B, and a flexible substrate 122C such as a COF (chip on film) that couples them to each other. The frame-shaped member 123 is a frame-shaped resin component that holds the liquid crystal panel 122. The rear housing 124 is a metal component including iron (Fe) or the like that houses the liquid crystal panel 122, the frame-shaped member 123, and the light source device 100. The timing controller substrate 127 is also mounted on the back surface of the rear housing 124.

In the display 101, the light from the light source device 100 is selectively transmitted by the liquid crystal panel 122, which allows for image display. Here, as described above in the first embodiment, because the light source device 100 that has excellent light emission controllability and improved light emission efficiency is included, it is possible to expect improvement in display quality of the display 101.

4. Other Modification Examples

The present disclosure has been described above using the embodiments and the modification examples. However, the present disclosure is not limited to the above-described embodiments, etc., and it is possible to make various modifications. For example, a material, a type, an arrangement position, a shape, and the like of each component of the light source device described in the above embodiments are not limited to those described above.

3.1 Modification Example 3-1

FIG. 13 is a cross-sectional diagram enlarging and illustrating a portion of a light source device 100A as Modification example 3-1 of the present disclosure. In the first embodiment described above, the light emitting element 20 is sealed with the sealing lens 21. However, the present disclosure is not limited to this. The light source device 100A includes a light source 2A instead of the light source 2. The light source 2A includes a light emitting element 20A instead of the light emitting element 20 and includes a cap lens 21A instead of the sealing lens 21.

The light emitting element 20A is, for example, a blue packaged LED. The light emitting element 20A specifically includes a light emission layer 25, a base 26, and a sealing material 27. The base 26 includes a recess-shaped housing part. The light emission layer 25 is disposed on a bottom surface of the housing part of the base 26. The housing part of the base 26 is filled with the sealing material 27. The light emission layer 25 is, for example, a point light source, and specifically, includes a blue LED. The base 26 is, for example, mounted on the light source substrate 11 with an external electrode including a lead frame or the like interposed therebetween, by soldering or the like. It is preferable that a surface of the housing part of the base 26 have a high reflectance with respect to light from the light emission layer 25. The surface of the housing part of the base 26 may include, for example, Ag as a material having the high reflectance. The sealing material 27 includes, for example, a transparent resin such as silicone or acrylic. The cap lens 21A is disposed immediately above the light emitting element 20A to be spaced away from the light emitting element 20A. At a center position of the cap lens 21A, a concave incident surface 21A1 is provided toward the light emitting element 20A to face the light emitting element 20A in the Z-axis direction. Furthermore, the cap lens 21A includes, for example, a convex emission surface 21A2 toward the diffusion sheet 7. Each of the incident surface 21A1 and the emission surface 21A2 exhibits a diffusion action with respect to the blue light LB from the light emitting element 20A.

In the light source device 100A having such a configuration, the blue light emitted from the light emitting element 20A is diffused by the cap lens 21A and the diffusion sheet 7, and thereafter, when passing through the wavelength conversion sheet 8, the blue light is converted into white light. Further, the white light converted from the blue light is improved in luminance and uniformized by the optical sheet group 9, and applied to a liquid crystal display panel or the like.

3.2 Modification Example 3-2

In the light source device 100A as Modification example 3-1 described above, the blue packaged LED is used as the light emitting element 20A. However, the present disclosure is not limited to this. For example, as a light emitting element 20B of a light source device 100B as Modification example 3-2 of the present disclosure illustrated in FIG. 14, a white packaged LED may be adopted instead of the blue packaged LED. The light emitting element 20B includes, for example, the light emission layer 25 including the blue LED, the base 26, and a sealing material 28 including a transparent resin including a wavelength conversion substance. Note that, in the light source device 100B, the wavelength conversion sheet 8 is unnecessary. As compared with the light source device 100A in FIG. 13, this is therefore advantageous in reducing the thickness of the entire configuration.

3.3 Modification Example 3-3

Furthermore, the light source device according to the present disclosure is not limited to a light source device in which a lens is disposed on a light emission side of a light emitting element. For example, as in a light source device 100C as Modification example 3-3 of the present disclosure illustrated in FIG. 15, for example, a plurality of light emitting elements 20C that are each a blue packaged LED may be disposed, without providing various lenses. The light emitting element 20C has a configuration substantially the same as the configuration of the light emitting element 20A illustrated in FIG. 13, and includes, for example, the light emission layer 25 including the blue LED, the base 26, and the sealing material 27. Note that the sealing material 27 may have a domical shape like the sealing lens 21 illustrated in FIG. 3 and may have a lens function. In the light source device 100C having such a configuration, blue light emitted from the light emitting element 20C is diffused by the diffusion sheet 7, and thereafter, when passing through the wavelength conversion sheet 8, the blue light is converted into white light. The white light converted from the blue light is improved in luminance and uniformized by the optical sheet group 9, and applied to a liquid crystal display panel or the like.

3.4 Modification Example 3-4

In the light source device 100C as Modification example 3-3 described above, the blue packaged LED is used as the light emitting element 20C. However, the present disclosure is not limited to this. For example, as a light emitting element 20D of a light source device 100D as Modification example 3-4 of the present disclosure illustrated in FIG. 16, a white packaged LED may be adopted instead of the blue packaged LED. The light emitting element 20D has a configuration substantially the same as the configuration of the light emitting element 20B illustrated in FIG. 14, and includes, for example, the light emission layer 25 including the blue LED, the base 26, and the sealing material 28 including the transparent resin including the wavelength conversion substance. Note that the sealing material 28 may have a domical shape like the sealing lens 21 illustrated in FIG. 3 and may have the lens function. In the light source device 100D, the wavelength conversion sheet 8 is unnecessary. As compared with the light source device 100C in FIG. 15, this is therefore advantageous in reducing the thickness of the entire configuration.

3.5 Modification Example 3-5

FIG. 17 is a cross-sectional diagram illustrating a configuration example of a light source device 100E as Modification example 3-5 of the present disclosure. The light source device 100E includes a spacer 6A instead of the spacer 6. The spacer 6A is a specific example corresponding to a "stud" of the present disclosure. The spacer 6A is provided to stand on the front surface 1FS of the substrate 1. The spacer 6A includes a main body 61 including a side surface S61 and a locking part 62 provided on the side surface S61. The side surface S61 is, for example, substantially orthogonal to the front surface 1FS. The reflection sheet 10 is provided between the locking part 62 and the front surface 1FS. It is preferable that the locking part 62 include an inclined surface S62 as an external surface forming an angle θ greater than or equal to 5° with respect to the side surface S61. The angle θ may be, for example, less than or equal to 45°.

In this way, because the spacer 6A including the locking part 62 is provided, it is possible to stably sandwich and hold a sheet-shaped optical member such as the reflection sheet 10 between the substrate 1 and the locking part 62 without adhering the sheet-shaped optical member on the substrate 1 or the resin layer 5. Therefore, as compared with a case where the reflection sheet 10 is adhered on the resin layer 5 using an adhesive or the like, manufacturing easiness is improved. Note that disposing the reflection sheet 10 in a gap between the substrate 1 and the locking part 62 is performed, for example, by putting the reflection sheet 10 having an opening over the spacer 6A standing on the substrate 1 from above and inserting the locking part 62 of the spacer 6A into the opening.

Here, if the locking part 62 includes the inclined surface S62 forming the angle θ greater than or equal to 5° and less than or equal to 45° with respect to the side surface S61, when the locking part 62 of the spacer 6A is inserted into the opening of the reflection sheet 10, the spacer 6A is more smoothly inserted into the opening of the reflection sheet 10.

Furthermore, effects described herein are merely examples and are not limited to the description herein, and may include any other effects. Furthermore, the present technology may have the following configurations.

(1)

A light source device including:

a substrate including a front surface and a rear surface on an opposite side of the front surface in a thickness direction, the first substrate having a through-hole;

a plurality of light sources provided on the front surface;

a connecter including a main body inserted in the through-hole of the substrate and a plurality of first terminals provided on the main body; and a plurality of wiring lines that each couple corresponding one of the plurality of light sources and corresponding one of the plurality of first terminals to each other, the plurality of wiring lines being provided on the front surface.

(2)

The light source device according to (1) described above, in which the connecter further includes a second terminal provided on the main body, and the second terminal is coupled to a conductor.

(3)

The light source device according to (1) or (2) described above, in which a projection height of the connecter from the front surface is less than or equal to a projection height of the light source from the front surface.

(4)

The light source device according to any one of (1) to (3) described above, in which the main body of the connecter extends in a first direction along the front surface, and the plurality of first terminals is provided on both side portions of the main body in a second direction orthogonal to the first direction and along the front surface and is arranged side by side in the first direction.

(5)

The light source device according to any one of (1) to (4) described above, in which an inner wall surface of the through-hole and the main body of the connecter have a gap between the inner wall surface of the through-hole and the main body of the connecter.

(6)

The light source device according to any one of (1) to (5) described above, in which the substrate includes a light source substrate that includes a first major surface on which the plurality of light sources and the plurality of wiring lines are mounted and a second major surface provided on an opposite side of the first major surface in the thickness direction, and a support substrate that is disposed to face the second major surface of the light source substrate and supports the light source substrate and the connecter.

(7)

The light source device according to any one of (1) to (6) described above, further including a reflection member provided in a region, within the front surface, other than a region where the plurality of light sources is provided.

(8)

The light source device according to any one of (1) to (7) described above, in which the light source includes a light emitting element provided on the front surface and a sealing lens that seals the light emitting element.

(9)

The light source device according to any one of (1) to (7) described above, in which the light source includes a light emitting element provided on the front surface and a cap lens disposed above the light emitting element.

(10)

The light source device according to (1) described above, further including:

a second substrate including an opposing surface that is opposed to the rear surface of the first substrate; and an engagement member that is provided on the opposing surface of the second substrate and is engageable with the connecter, in which the connecter includes a first engagement part provided at a position facing the engagement member, the engagement member includes a second engagement part that is engageable with the first engagement part, each of the first engagement part and the second engagement part has a rectangular plane shape including a first side and a second side substantially orthogonal to each other on a plane orthogonal to the thickness direction, and a ratio of a length of the second side to a length of the first side is greater than or equal to 0.5 and less than or equal to 1.5.

(11)

The light source device according to (10) described above, in which the length of the first side and the length of the second side substantially match each other.

(12)

The light source device according to (11) described above, in which the plurality of light sources is arranged at a first pitch along the first side and is arranged at a second pitch along the second side, and a ratio of the second pitch to the first pitch substantially matches the ratio of the length of the second side to the length of the first side.

(13)

The light source device according to (12) described above, in which the first pitch and the second pitch substantially match each other.

(14)

The light source device according to any one of (10) to (13) described above, in which the first engagement part includes a protrusion that is projected toward the second engagement part, and the second engagement part has a recess in which the protrusion is to be inserted and that is engageable with the protrusion.

(15)

The light source device according to (14) described above, in which at least one of the protrusion or the recess includes an inclined surface inclined with respect to the plane.

(16)

The light source device according to (15) described above, in which the inclined surface includes a first inclined surface portion along the first side, a second inclined surface portion along the second side, and a third inclined surface portion intersecting with both of the first inclined surface portion and the second inclined surface portion.

(17)

The light source device according to (7) described above, further including a stud that is provided to stand on an opposite side of the first substrate to the rear surface, in which the stud includes a side surface and a locking part provided on the side surface, and the reflection member is provided between the locking part and the front surface of the first substrate.

(18)

The light source device according to (17) described above, in which the locking part includes an external surface inclined at an angle greater than or equal to 5 degrees with respect to the side surface.

(19)

A display including:

a light source device that emits illumination light; and a display unit that displays an image on the basis of the illumination light from the light source device, in which the light source device includes a substrate including a front surface and a rear surface on an opposite side of the front surface in a thickness direction, the first substrate having a through-hole, a plurality of light sources provided on the front surface, a connecter including a main body inserted in the through-hole of the first substrate and a plurality of first terminals provided on the main body, and a plurality of wiring lines that each couple corresponding one of the plurality of light sources and corresponding one of the plurality of first terminals to each other, the plurality of wiring lines being provided on the front surface.

REFERENCE SIGNS LIST

The present application claims the benefit of Japanese Priority Patent Application No. 2021-199857 filed on Dec. 9, 2021 and Japanese Priority Patent Application No. 2022-090950 filed on Jun. 3, 2022 with the Japan Patent Office, the entire contents of which are incorporated in herein by reference.

It should be understood by those skilled in the art that various modifications, combinations, sub-combinations, and alterations may occur depending on design requirements and other factors insofar as they are within the scope of the appended claims or the equivalents thereof.

The invention claimed is:

1. A light source device comprising:

a first substrate including a front surface and a rear surface on an opposite side of the front surface in a thickness direction, the first substrate having a through-hole;

a plurality of light sources provided on the front surface;

a connector including a main body inserted in the through-hole of the first substrate and a plurality of first terminals provided on the main body; and a plurality of wiring lines that each couple corresponding one of the plurality of light sources and corresponding one of the plurality of first terminals to each other, the plurality of wiring lines being provided on the front surface, wherein a gap is provided between an inner wall surface of the through-hole and the main body of the connector.

2. The light source device according to claim 1, wherein the connector further includes a second terminal provided on the main body, and the second terminal is coupled to a conductor.

3. The light source device according to claim 1, wherein a projection height of the connector from the front surface is less than or equal to a projection height of the light source from the front surface.

4. The light source device according to claim 1, wherein the main body of the connector extends in a first direction along the front surface, and the plurality of first terminals is provided on both side portions of the main body in a second direction orthogonal to the first direction and along the front surface and is arranged side by side in the first direction.

5. The light source device according to claim 1, wherein the first substrate includes a light source substrate that includes a first major surface on which the plurality of light sources and the plurality of wiring lines are mounted and a second major surface provided on an opposite side of the first major surface in the thickness direction, and a support substrate that is disposed to face the second major surface of the light source substrate and supports the light source substrate and the connector.

6. The light source device according to claim 1, further comprising a reflection member provided in a region, within the front surface, other than a region where the plurality of light sources is provided.

7. The light source device according to claim 1, wherein the light source includes a light emitting element provided on the front surface and a sealing lens that seals the light emitting element.

8. The light source device according to claim 1, wherein the light source includes a light emitting element provided on the front surface and a cap lens disposed above the light emitting element.

9. A light source device comprising:

a first substrate including a front surface and a rear surface on an opposite side of the front surface in a thickness direction, the first substrate having a through-hole;

a plurality of light sources provided on the front surface;

a connector including a main body inserted in the through-hole of the first substrate and a plurality of first terminals provided on the main body;

a plurality of wiring lines that each couple corresponding one of the plurality of light sources and corresponding one of the plurality of first terminals to each other, the plurality of wiring lines being provided on the front surface;

a second substrate including an opposing surface that is opposed to the rear surface of the first substrate; and an engagement member that is provided on the opposing surface of the second substrate and is engageable with the connector, wherein the connector includes a first engagement part provided at a position facing the engagement member, the engagement member includes a second engagement part that is engageable with the first engagement part, each of the first engagement part and the second engagement part has a rectangular plane shape including a first side and a second side substantially orthogonal to each other on a plane orthogonal to the thickness direction, and a ratio of a length of the second side to a length of the first side is greater than or equal to 0.5 and less than or equal to 1.5.

10. The light source device according to claim 9, wherein a gap is provided between an inner wall surface of the through-hole and the main body of the connector.

11. The light source device according to claim 9, wherein the length of the first side and the length of the second side substantially match each other.

12. The light source device according to claim 11, wherein the plurality of light sources is arranged at a first pitch along the first side and is arranged at a second pitch along the second side, and a ratio of the second pitch to the first pitch substantially matches the ratio of the length of the second side to the length of the first side.

13. The light source device according to claim 12, wherein the first pitch and the second pitch substantially match each other.

14. The light source device according to claim 9, wherein the first engagement part includes a protrusion that is projected toward the second engagement part, and the second engagement part has a recess in which the protrusion is to be inserted and that is engageable with the protrusion.

15. The light source device according to claim 14, wherein at least one of the protrusion or the recess includes an inclined surface inclined with respect to the plane.

16. The light source device according to claim 15, wherein the inclined surface includes a first inclined surface portion along the first side, a second inclined surface portion along the second side, and a third inclined surface portion intersecting with both of the first inclined surface portion and the second inclined surface portion.

17. The light source device according to claim 7, further comprising a stud that is provided to stand on an opposite side of the first substrate to the rear surface, wherein the stud includes a side surface and a locking part provided on the side surface, and the reflection member is provided between the locking part and the front surface of the first substrate.

18. A light source device comprising:

a first substrate including a front surface and a rear surface on an opposite side of the front surface in a thickness direction, the first substrate having a through-hole;

a plurality of light sources provided on the front surface;

a connector including a main body inserted in the through-hole of the first substrate and a plurality of first terminals provided on the main body;

a plurality of wiring lines that each couple corresponding one of the plurality of light sources and corresponding one of the plurality of first terminals to each other, the plurality of wiring lines being provided on the front surface;

a reflection member provided in a region, within the front surface, other than a region where the plurality of light sources is provided;

a stud that is provided to stand on an opposite side of the first substrate to the rear surface, wherein the stud includes a side surface and a locking part provided on the side surface, and the reflection member is provided between the locking part and the front surface of the first substrate, wherein the locking part includes an external surface inclined at an angle greater than or equal to 5 degrees with respect to the side surface.

19. A display comprising:

a light source device that emits illumination light; and a display unit that displays an image on a basis of the illumination light from the light source device, wherein the light source device includes a first substrate including a front surface and a rear surface on an opposite side of the front surface in a thickness direction, the first substrate having a through-hole, a plurality of light sources provided on the front surface, a connector including a main body inserted in the through-hole of the first substrate and a plurality of first terminals provided on the main body, and a plurality of wiring lines that each couple corresponding one of the plurality of light sources and corresponding one of the plurality of first terminals to each other, the plurality of wiring lines being provided on the front surface, wherein a gap is provided between an inner wall surface of the through-hole and the main body of the connector.

20. The display according to claim 19, wherein the connector further includes a second terminal provided on the main body, and the second terminal is coupled to a conductor.

* * * * *